United States Patent
Chi et al.

(10) Patent No.: US 11,414,447 B2
(45) Date of Patent: Aug. 16, 2022

(54) PLATINUM COMPLEX, NITROGEN-CONTAINING BIDENTATE CHELATE, AND APPARATUS FOR PROVIDING VISIBLE EMISSION OR NEAR-INFRARED EMISSION

(71) Applicants: National Tsing Hua University, Hsinchu (TW); City University of Hong Kong, Kowloon (HK)

(72) Inventors: Yun Chi, Hsinchu (TW); Sheng-Fu Wang, Hsinchu (TW); Li-Wen Fu, Hsinchu (TW)

(73) Assignees: National Tsing Hua University, Hsinchu (TW); City of University of Hong Kong, Kowloon (HK)

( * ) Notice: Subject to any disclaimer, the term of this patent is extended or adjusted under 35 U.S.C. 154(b) by 0 days.

(21) Appl. No.: 17/148,583

(22) Filed: Jan. 14, 2021

(65) Prior Publication Data
US 2022/0144870 A1 May 12, 2022

(30) Foreign Application Priority Data
Nov. 12, 2020 (TW) .................. 109139463

(51) Int. Cl.
*C07F 15/00* (2006.01)
*H01L 51/00* (2006.01)

(52) U.S. Cl.
CPC ................ *C07F 15/0086* (2013.01)

(58) Field of Classification Search
CPC ... C07F 15/0086; H01L 51/0087; H01L 51/50
USPC .................. 544/225; 313/498, 504
See application file for complete search history.

(56) References Cited

U.S. PATENT DOCUMENTS

| | | | |
|---|---|---|---|
| 9,553,277 B2 | 1/2017 | Chi et al. | |
| 10,640,525 B2 | 5/2020 | Chi et al. | |

FOREIGN PATENT DOCUMENTS

| | | |
|---|---|---|
| CN | 108892691 | 11/2018 |
| KR | 20140140298 | 12/2014 |
| TW | 200610804 | 4/2006 |
| TW | I546310 | 8/2016 |
| TW | 201723144 | 7/2017 |
| TW | 201821418 | 6/2018 |

OTHER PUBLICATIONS

"Office Action of Taiwan Counterpart Application", dated Aug. 30, 2021, p. 1-p. 4.
Yu-Chen Wei et al., "Overcoming the energy gap law in near-infrared OLEDs by exciton-vibration decoupling," nature photonics, vol. 14, Jun. 29, 2020, pp. 570-577.
Sheng Fu Wang et al., "Highly Efficient Near-Infrared Electroluminescence up to 800 nm Using Platinum(II) Phosphors," Advanced Functional Materials, vol. 30, Issue 30, Jun. 11, 2020, pp. 1-9.

*Primary Examiner* — Charanjit Aulakh
(74) *Attorney, Agent, or Firm* — JCIPRNET

(57) ABSTRACT

Provided is a platinum complex having a structure represented by formula (I):

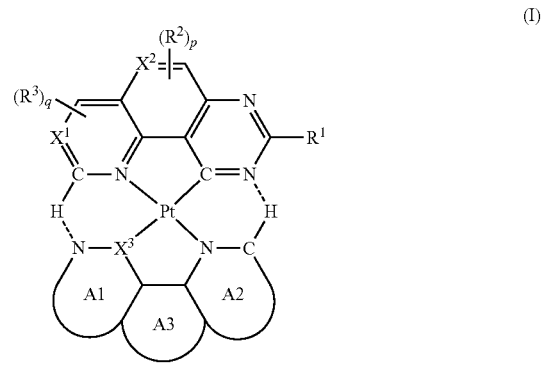

wherein A1 to A3 each independently represent a 5-membered or 6-membered unsaturated ring, A3 is optionally formed between A1 and A2; $X^1$, $X^2$, and $X^3$ each independently represent carbon or nitrogen; $R^1$ represents hydrogen, substituted or unsubstituted $C_1$-$C_6$ alkyl, —$CF_2H$, —$CFH_2$, substituted or unsubstituted $C_6$-$C_{12}$ aryl or —$C_mF_{2m+1}$, m is an integer of 1 to 5; $R^2$ and $R^3$ each independently represent hydrogen, $C_1$-$C_{12}$ alkyl, substituted or unsubstituted $C_1$-$C_6$ alkoxyl, substituted or unsubstituted $C_6$-$C_{12}$ aryl, or —$C_nF_{2n+1}$, n is an integer of 0 to 3; p and q each independently represent an integer of 1 to 2; and when p or q is equal to 2, two $R^2$'s or $R^3$'s may join to form a $C_3$-$C_8$ aromatic or nitrogen-containing heteroaromatic ring.

7 Claims, 4 Drawing Sheets

PLATINUM COMPLEX, NITROGEN-CONTAINING BIDENTATE CHELATE, AND APPARATUS FOR PROVIDING VISIBLE EMISSION OR NEAR-INFRARED EMISSION

CROSS-REFERENCE TO RELATED APPLICATION

This application claims the priority benefit of Taiwan application serial no. 109139463, filed on Nov. 12, 2020. The entirety of the above-mentioned patent application is hereby incorporated by reference herein and made a part of this specification.

BACKGROUND OF THE INVENTION

Field of the Invention

The invention relates to a metal complex and an application thereof, and more particularly, to a platinum complex and an application thereof.

Description of Related Art

Organic light-emitting diode devices have advantages such as high brightness, fast screen response, light weighted and thin structure, full color, no viewing angle difference, no need of LCD backlighting, and lower energy and power consumption, and are currently widely used in the production of large-area, high-brightness, full-color flat-panel displays.

To develop various new light-emitting devices having an emission range covering both the visible region and near-infrared region, the development of various colored light-emitting materials having high stability and high efficiency is the main objective of current OLED research. The existing tetra-coordinated, square-planar platinum complexes have suitable emission properties, but the synthetic processes thereof often require more time-consuming purification steps, causing difficulties in mass production. In addition, there is also no suitable molecular design that allow synthesized platinum complexes to exhibit efficient luminescence in the near infrared region beyond 700 nm, making design and preparation of efficient near infrared emitting Pt(II) complexes as one object of the highest priority in organic light-emitting diode technologies.

SUMMARY OF THE INVENTION

The invention provides a platinum complex, a nitrogen-containing bidentate chelate, and an application thereof. The platinum complex prepared by the invention has a stable structure and excellent efficiency (especially in the saturated red to near-infrared light region), and is easy to synthesize.

The invention provides a platinum complex having a structure represented by general formula (I):

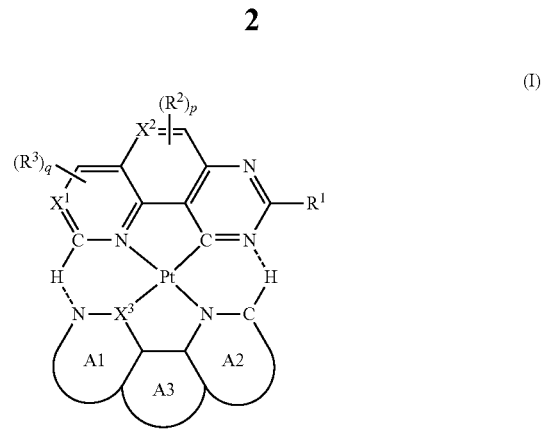

(I)

wherein A1 to A3 each independently represent a 5-membered or 6-membered unsaturated ring, A3 is optionally formed between A1 and A2; $X^1$, $X^2$, and $X^3$ each independently represent carbon or nitrogen; $R^1$ represents hydrogen, substituted or unsubstituted $C_1$-$C_6$ alkyl, —$CF_2H$, —$CFH_2$, substituted or unsubstituted $C_6$-$C_{12}$ aryl or —$C_mF_{2m+1}$, m is an integer of 1 to 5; $R^2$ and $R^3$ each independently represent hydrogen, $C_1$-$C_{12}$ alkyl, substituted or unsubstituted $C_1$-$C_6$ alkoxyl, substituted or unsubstituted $C_6$-$C_{12}$ aryl, or —$C_nF_{2n+1}$, n is an integer of 0 to 3; p and q each independently represent an integer of 1 to 2; when p is equal to 2, two $R^2$'s may join to form a $C_3$-$C_8$ aromatic or nitrogen-containing heteroaromatic ring; and when q is equal to 2, two $R^3$'s may join to form a $C_3$-$C_8$ aromatic or nitrogen-containing heteroaromatic ring.

The invention provides an apparatus for generation of visible or near-infrared emission from the aforementioned platinum complex.

The invention provides a nitrogen-containing bidentate chelate having a structure represented by general formula (II):

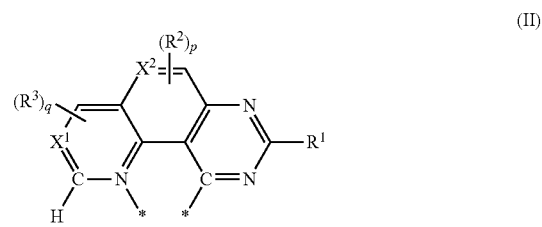

(II)

wherein * represents a bonding site; $X^1$ and $X^2$ each independently represent carbon or nitrogen; $R^1$ represents hydrogen, substituted or unsubstituted $C_1$-$C_6$ alkyl, —$CF_2H$, —$CFH_2$, substituted or unsubstituted $C_6$-$C_{12}$ aryl or —$C_mF_{2m+1}$, m is an integer of 1 to 5; $R^2$ and $R^3$ each independently represent hydrogen, $C_1$-$C_{12}$ alkyl, substituted or unsubstituted $C_1$-$C_6$ alkoxyl, substituted or unsubstituted $C_6$-$C_{12}$ aryl, or —$C_nF_{2n+1}$, n is an integer of 0 to 3; p and q each independently represent an integer of 1 to 2; when p is equal to 2, two $R^2$'s may join to form a $C_3$-$C_8$ aromatic or nitrogen-containing heteroaromatic ring; and when q is equal to 2, two $R^3$'s may join to form a $C_3$-$C_8$ aromatic or nitrogen-containing heteroaromatic ring.

Based on the abovementioned facts, the platinum complex of this invention has two nitrogen-containing aryl chelating chelates, and one 6-membered ring structure is added between the two nitrogen-containing aryl chelates. Therefore, the rigidity and the planarity may be significantly enhanced. The platinum complex of this invention has a better planar molecular structure and more effective and better extended π-conjugation, and the latter is provided by the multiple connected 6-membered ring structure within the chelate. In the invention, these structural characteristics provide the resulting platinum complex with better photophysical properties, such as red shifted emission wavelength into the near-infrared region and increased photoluminescence quantum efficiency.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF THE EMBODIMENTS

Figure 1:
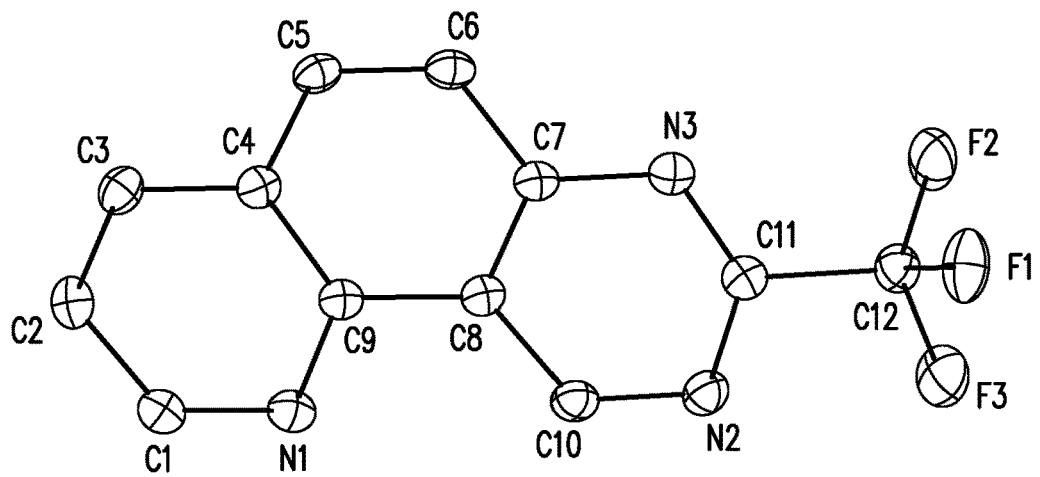
FIG. 1 shows the molecular structure of the chelate L1 of the invention, obtained by the single crystal X-ray diffraction study.

Hereinafter, the invention is further described by way of embodiments, but the embodiments are only for illustrative purposes and are not used to limit the scope of the invention.

[Structure of Platinum Complex]

The invention provides a platinum complex having a structure represented by general formula (I):

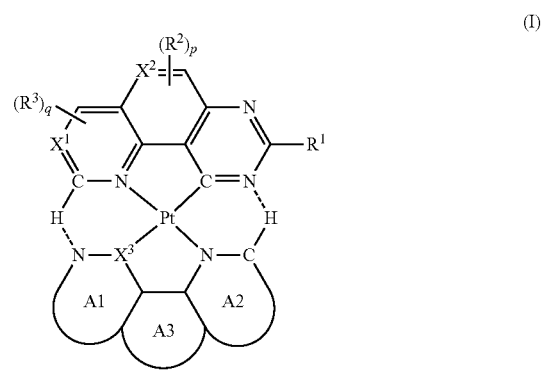

wherein A1 to A3 are each independently an unsaturated 5-membered ring or an unsaturated 6-membered ring, and A3 may optionally be formed between A1 and A2; $X^1$, $X^2$, and $X^3$ are each independently carbon or nitrogen; $R^1$ is hydrogen, substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^2$ and $R^3$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; p and q are each independently an integer of 1 to 2; when p is equal to 2, two $R^2$'s may join to form a $C_3$-$C_8$ aromatic or nitrogen-containing heteroaromatic ring; and when q is equal to 2, two $R^3$'s may join to form a $C_3$-$C_8$ aromatic or nitrogen-containing heteroaromatic ring.

The aromatic ring or the nitrogen-containing heteroaromatic ring may include an aromatic hydrocarbon ring or an aromatic heterocycle. Specific examples of the aromatic ring or the nitrogen-containing heteroaromatic ring include benzene, pyridine, pyrazine, pyrimidine, pyridazine, triazine, pyrrole, furan, thiophene, selenophene, tellurophene, imidazole, thiazole, selenazole, tellurazole, thiadiazole, oxadiazole, and pyrazole.

In an embodiment, when A1 is a 6-membered ring, A2 is a 6-membered ring, and A3 is a 6-membered ring, the platinum complex of the invention has a structure represented by general formula (IA):

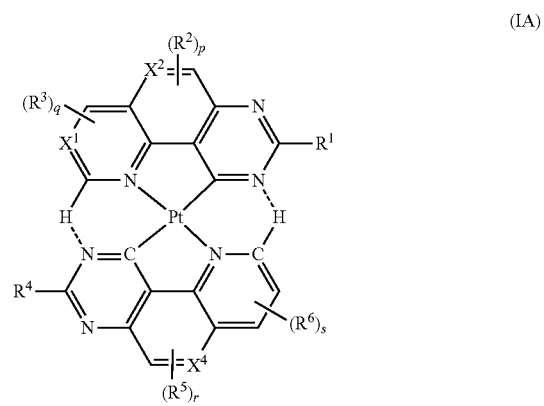

wherein $X^4$ is carbon or nitrogen; $R^4$ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^5$ and $R^6$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; r and s are each independently an integer of 1 to 2; when r is equal to 2, two $R^5$'s may join to form a $C_3$-$C_8$ aromatic or nitrogen-containing heteroaromatic ring; and when s is equal to 2, two $R^6$'s may join to form a $C_3$-$C_8$ aromatic or nitrogen-containing heteroaromatic ring.

In an embodiment, the platinum complex of the invention has a structure represented by any of formula (IA-1) to formula (IA-22):

IA-1
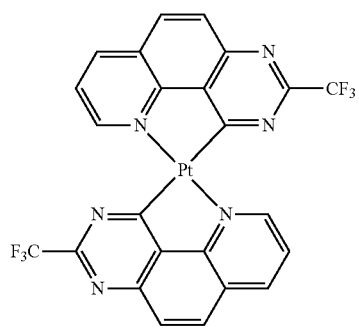

IA-2
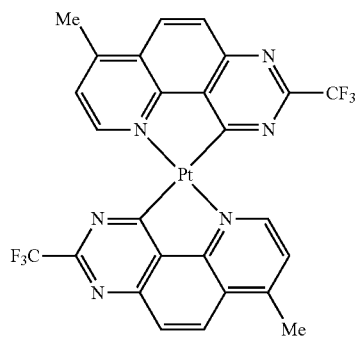

IA-3
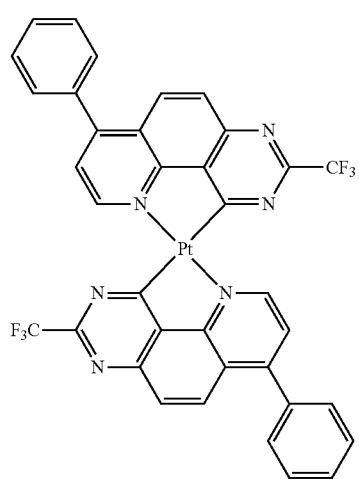

IA-4
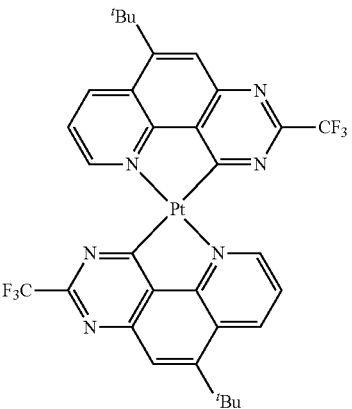

IA-5
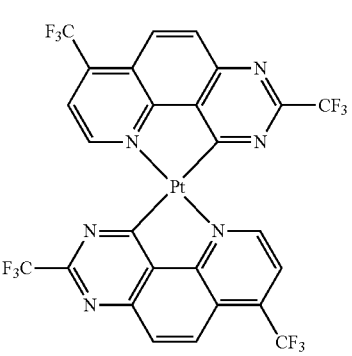

IA-6
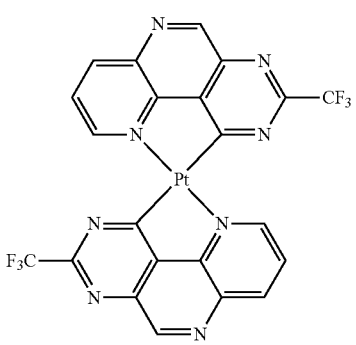

IA-7
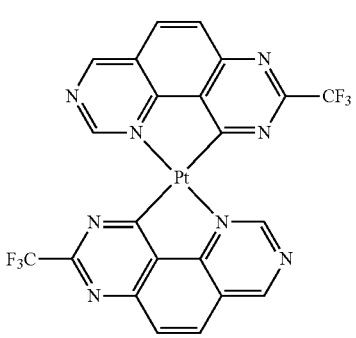

-continued
IA-8
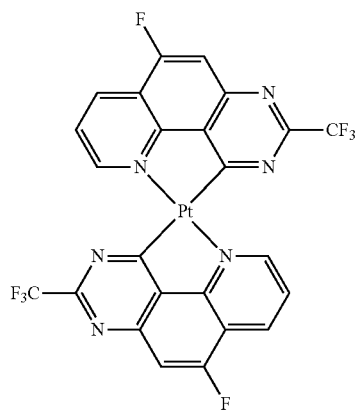
IA-9
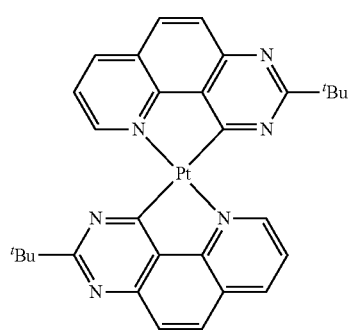
IA-10
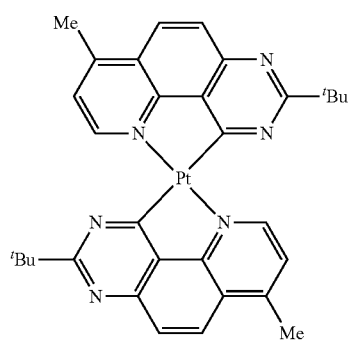
IA-11
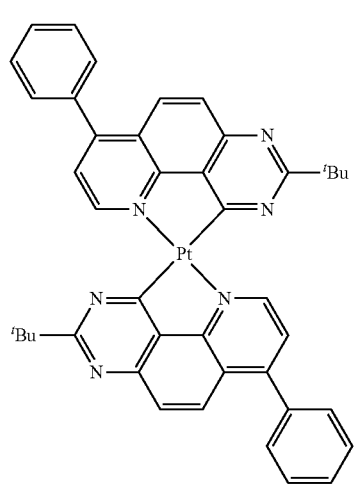
-continued
IA-12
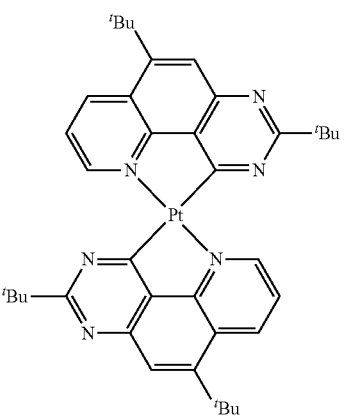
IA-13
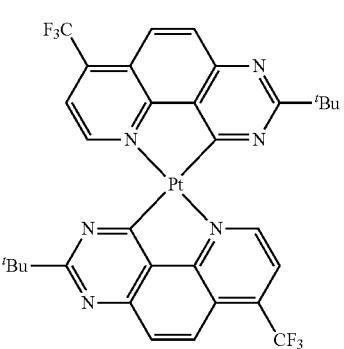
IA-14
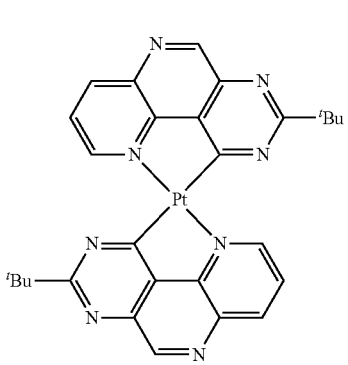
IA-15
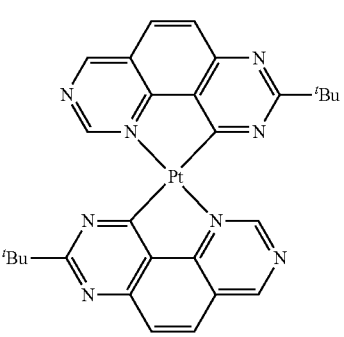

-continued
IA-16
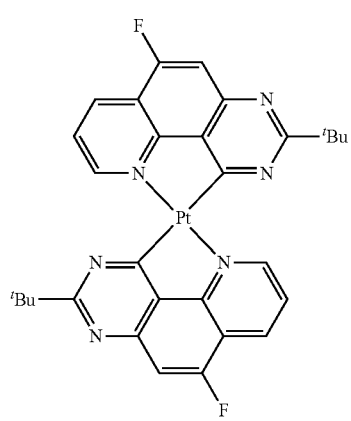
IA-17
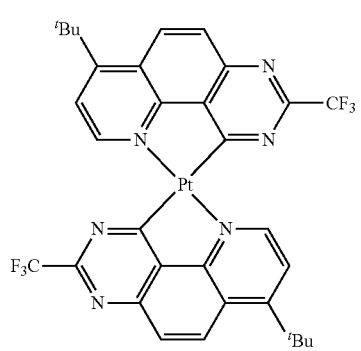
IA-18
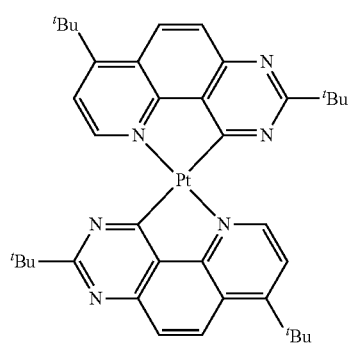
IA-19
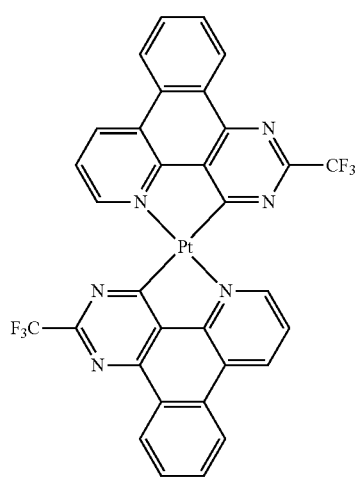
-continued
IA-20
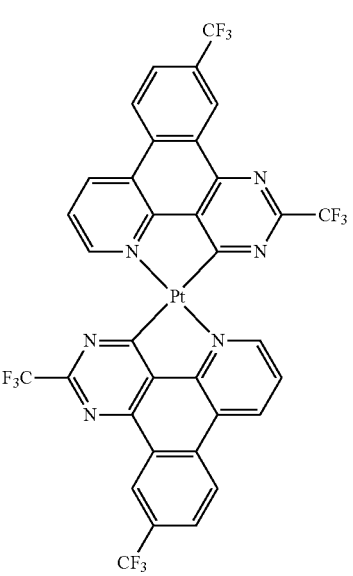
IA-21
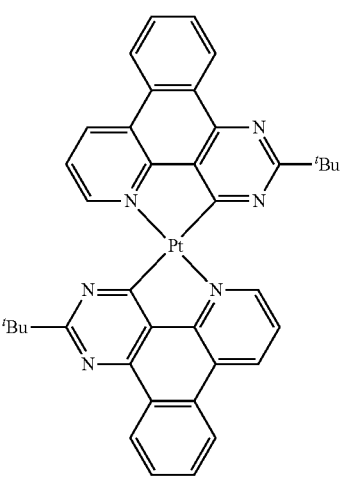
IA-22
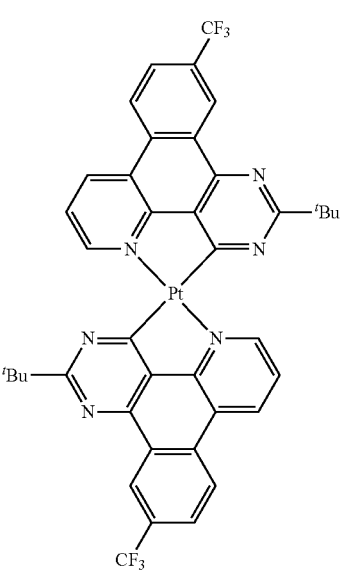
In an embodiment, when A1 is a 5-membered ring, A2 is a 6-membered ring, and A3 is a 6-membered ring, the platinum complex of the invention has a structure represented by general formula (IB):

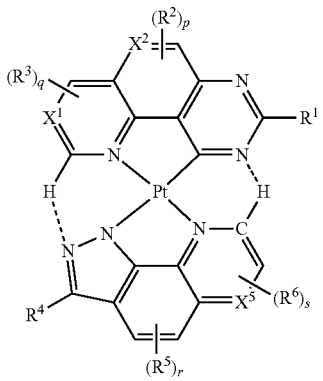

(IB)

wherein $X^5$ is carbon or nitrogen; $R^4$ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^5$ and $R^6$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; r and s are each independently an integer of 1 to 2; when r is equal to 2, two $R^5$'s may join to form a $C_3$-$C_8$ aromatic or nitrogen-containing heteroaromatic ring; and when s is equal to 2, two $R^6$'s may join to form a $C_3$-$C_8$ aromatic or nitrogen-containing heteroaromatic ring.

In an embodiment, the platinum complex of the invention has a structure represented by any of formula (IB-1) to formula (IB-28):

IB-1

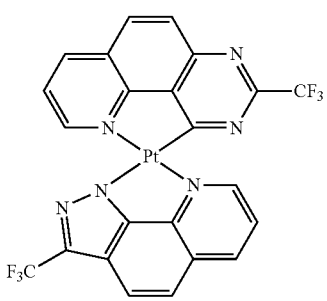

IB-2

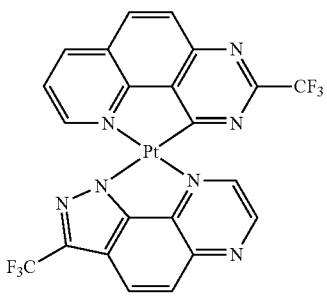

IB-3

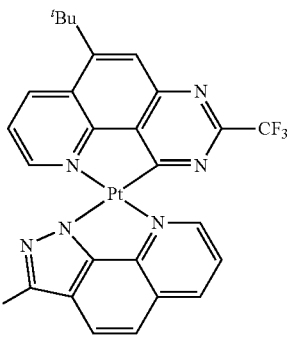

IB-4

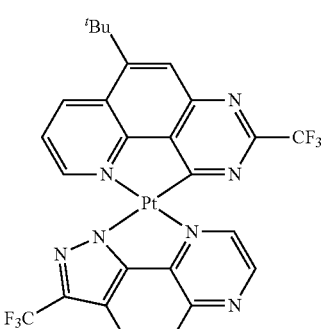

IB-5

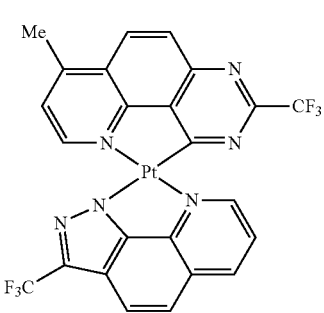

IB-6

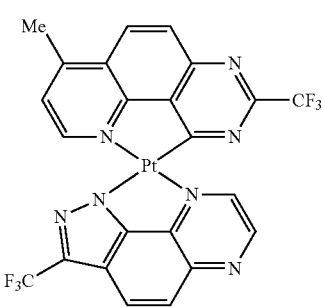

IB-7

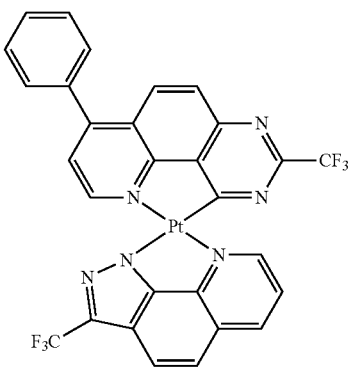

IB-8 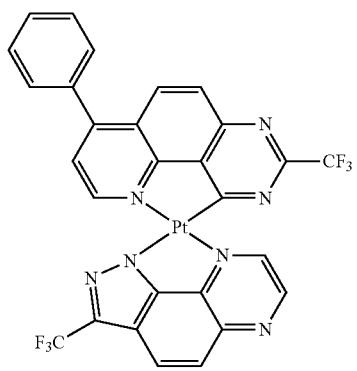
IB-9 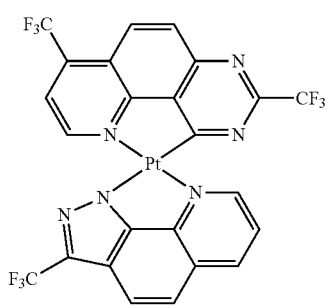
IB-10 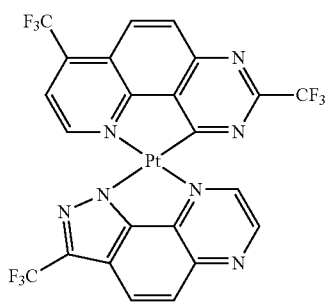
IB-11 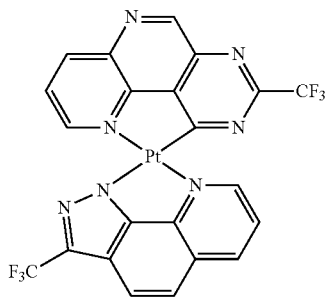
IB-12 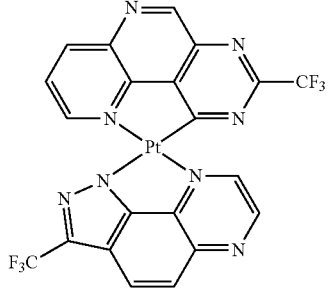
IB-13 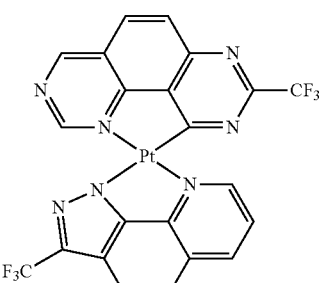
IB-14 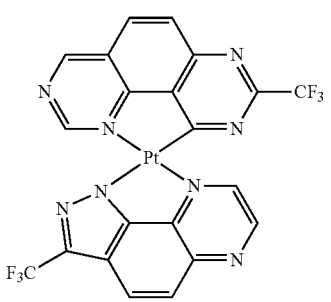
IB-15 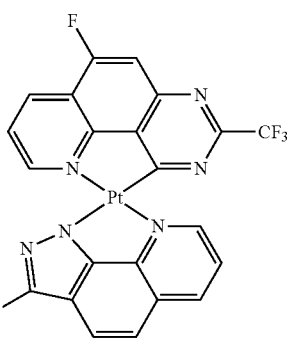
IB-16 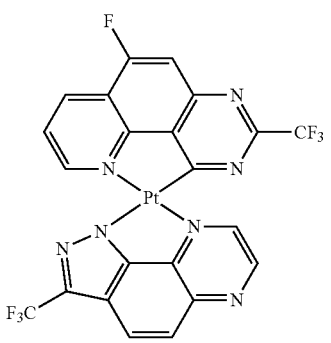
IB-17 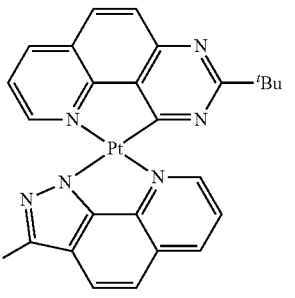

IB-18 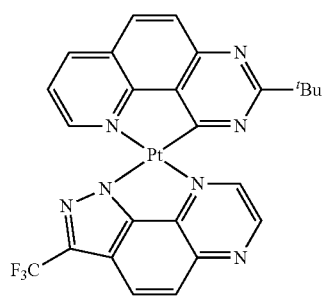
IB-19 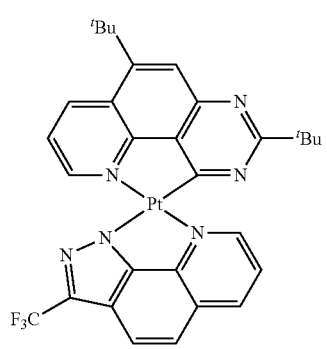
IB-20 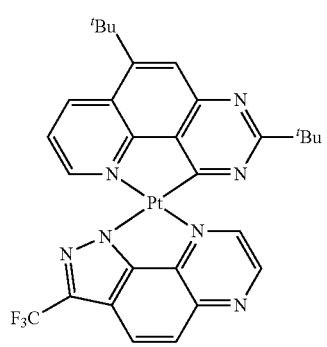
IB-21 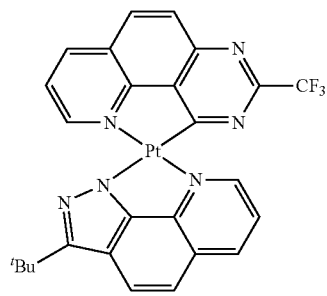
IB-22 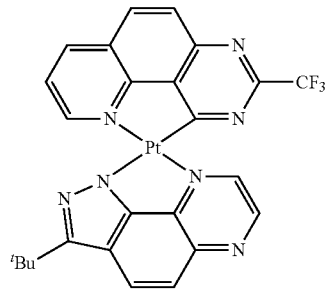
IB-23 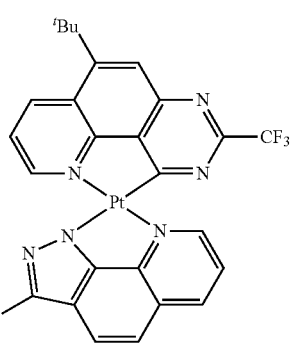
IB-24 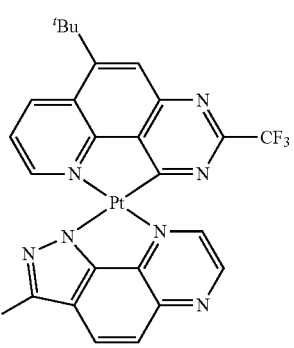
IB-25 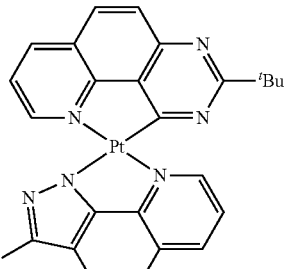
IB-26 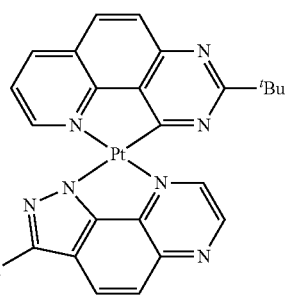
IB-27 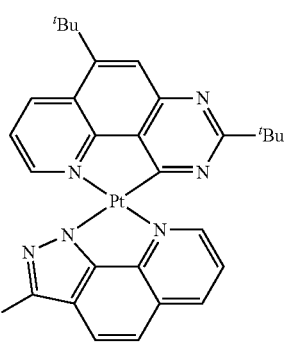

-continued

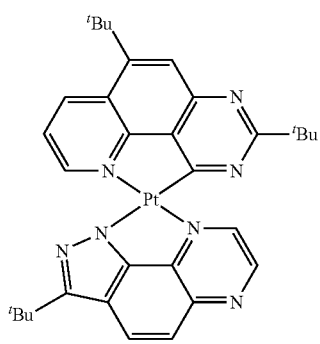
IB-28

In an embodiment, when A1 is a 6-membered ring and A2 is a 6-membered ring, the platinum complex of the invention has a structure represented by general formula (IC):

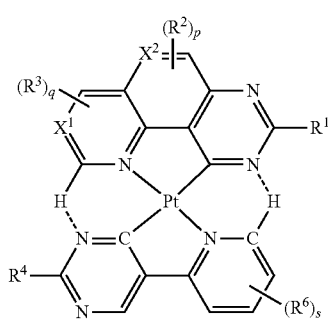
(IC)

wherein $R^4$ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^6$ is hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; s is an integer of 1 to 3; and when s is equal to or greater than 2, two or more $R^6$'s may join to form a $C_3$-$C_8$ aromatic or nitrogen-containing heteroaromatic ring.

In an embodiment, the platinum complex of the invention has a structure represented by any of formula (IC-1) to formula (IC-16):

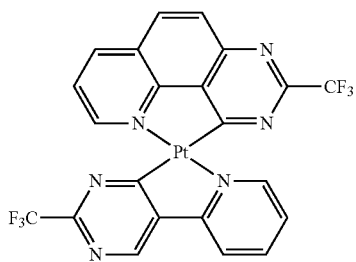
IC-1

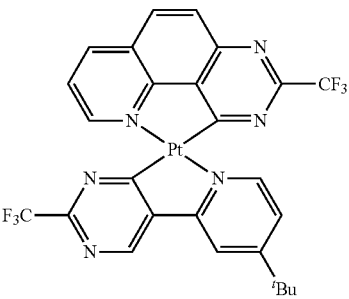
IC-2

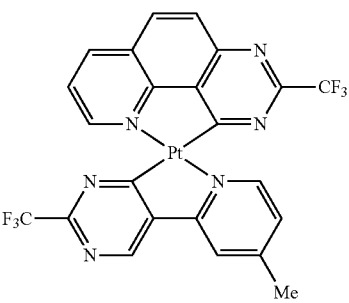
IC-3

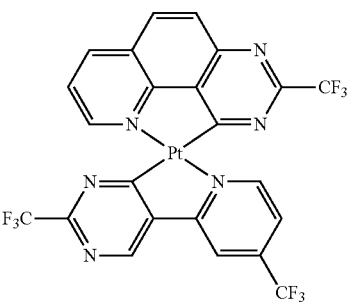
IC-4

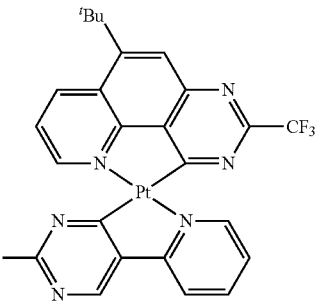
IC-5

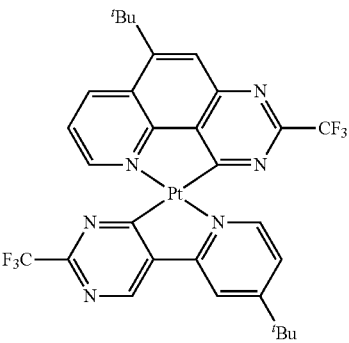
IC-6

IC-7
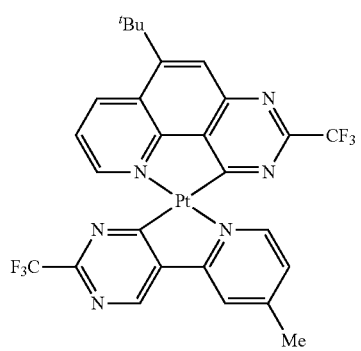
IC-8
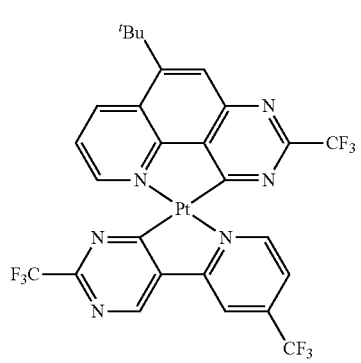
IC-9
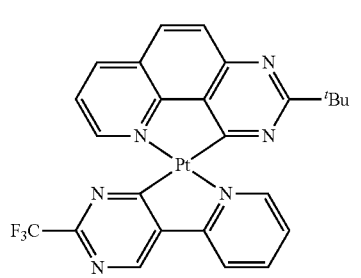
IC-10
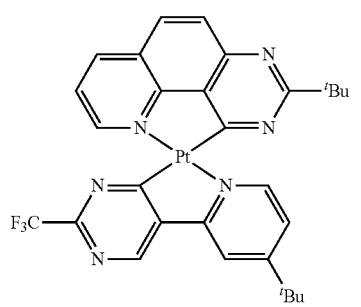
IC-11
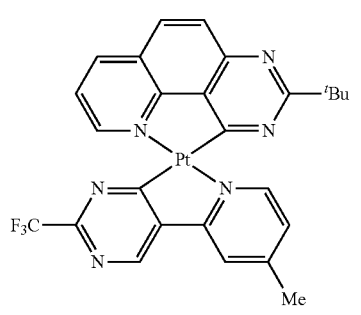
IC-12
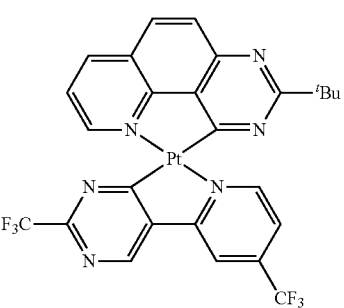
IC-13
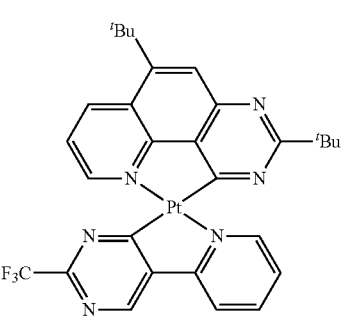
IC-14
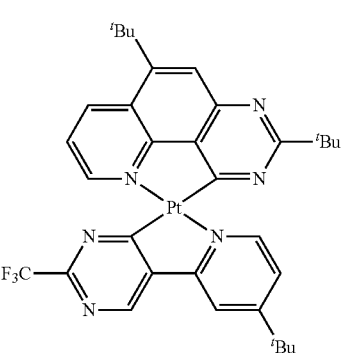
IC-15
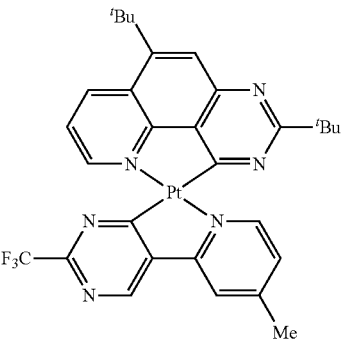

IC-16

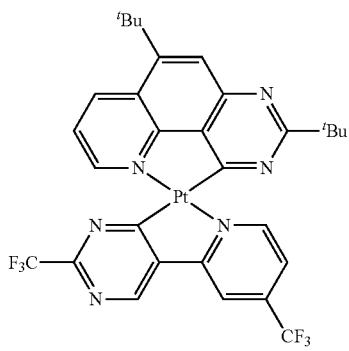

In an embodiment, when A1 is a 5-membered ring and A2 is a 6-membered ring, the platinum complex of the invention has a structure represented by general formula (ID):

(ID)

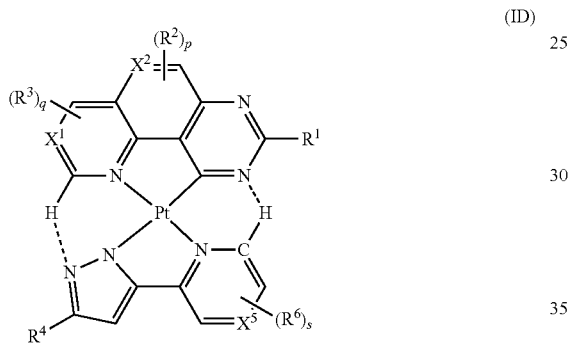

wherein $X^5$ is carbon or nitrogen; $R^4$ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^6$ is hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; s is an integer of 1 to 3; and when s is equal to or greater than 2, two or more $R^6$'s may join to form a $C_3$-$C_8$ aromatic or nitrogen-containing heteroaromatic ring.

In an embodiment, the platinum complex of the invention has a structure represented by any of formula (ID-1) to formula (ID-36):

ID-1

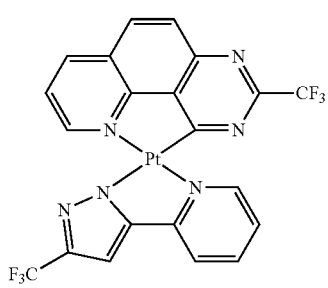

ID-2

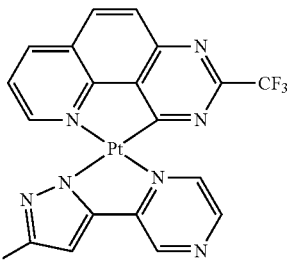

ID-3

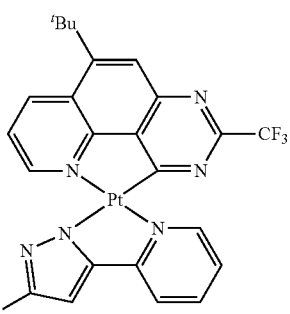

ID-4

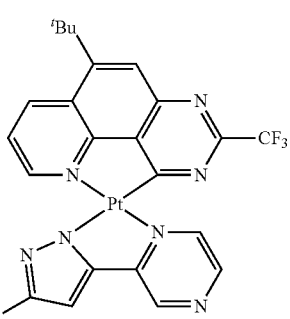

ID-5

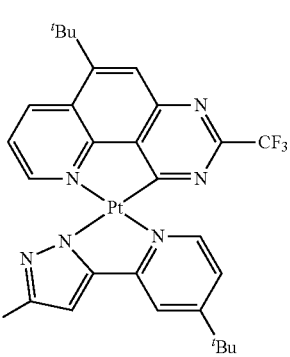

ID-6

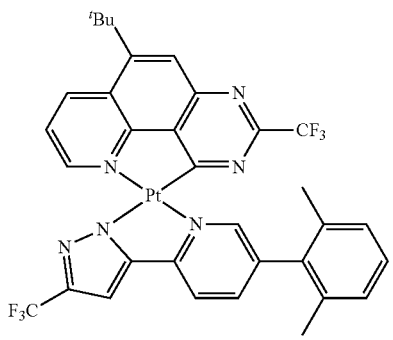

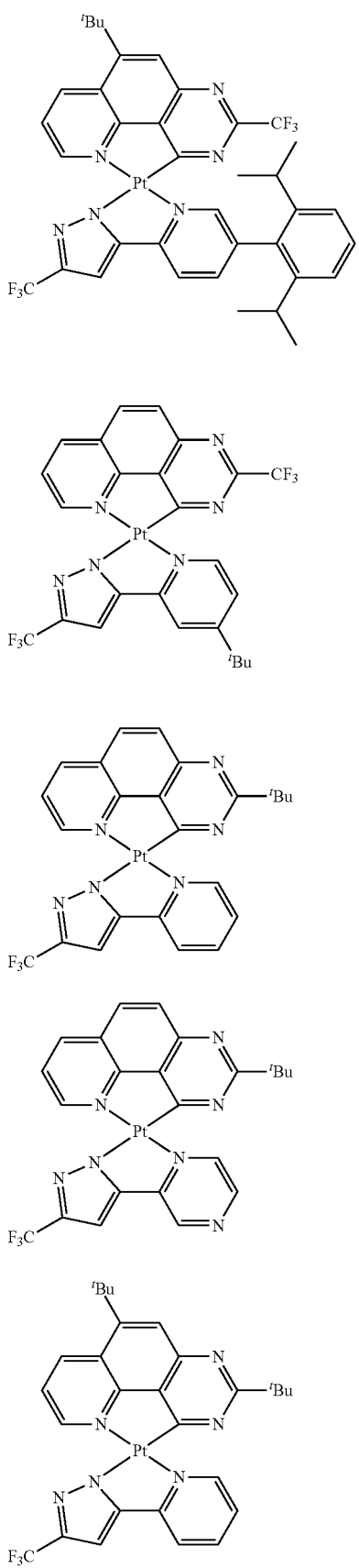
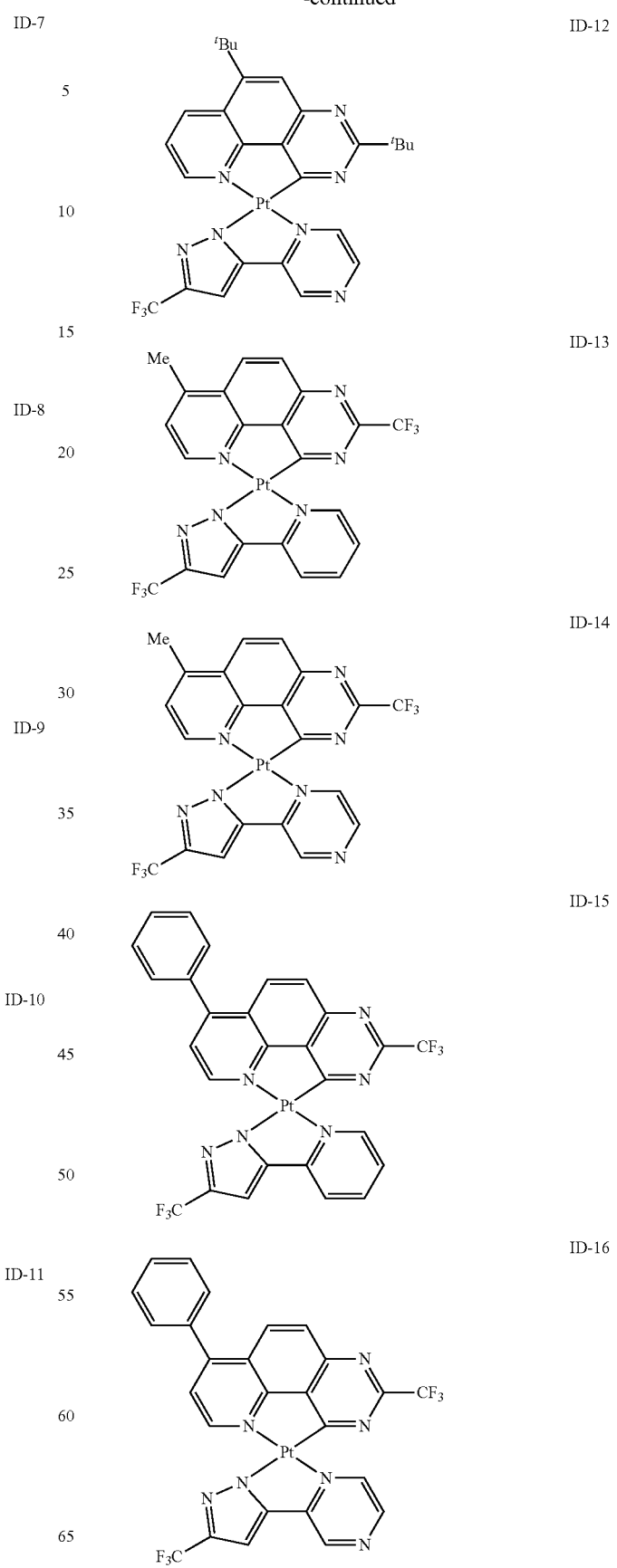

-continued
ID-17
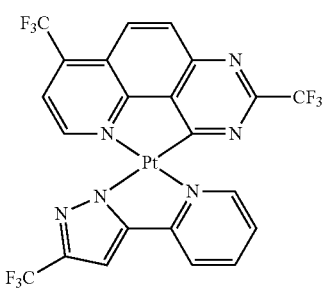
ID-18
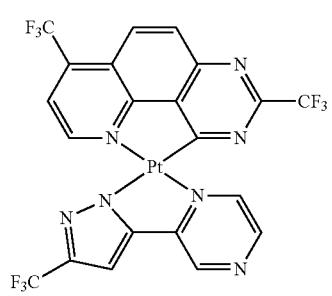
ID-19
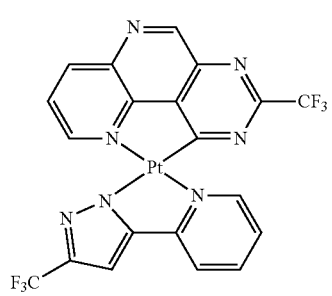
ID-20
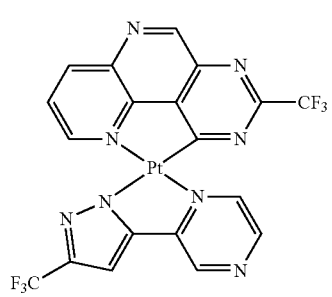
ID-21
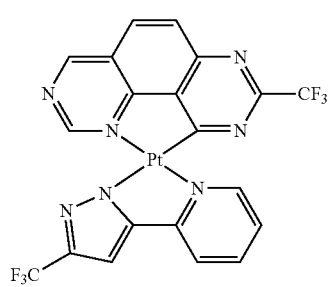
-continued
ID-22
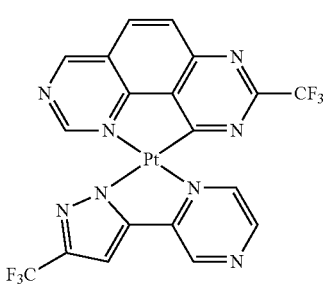
ID-23
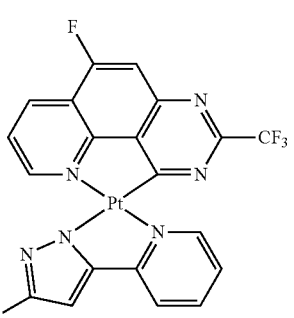
ID-24
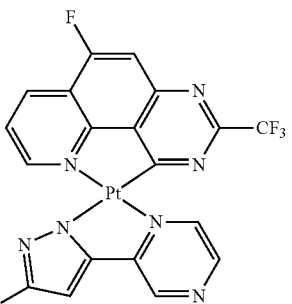
ID-25
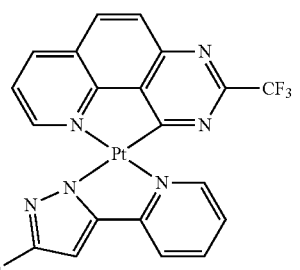
ID-26
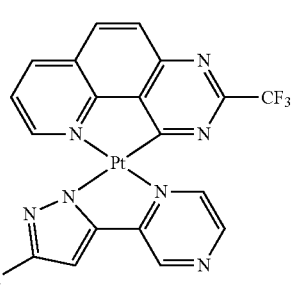

ID-27
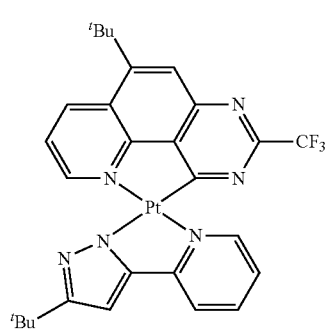
ID-28
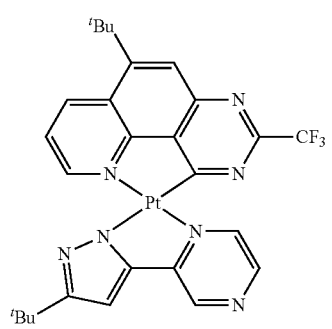
ID-29
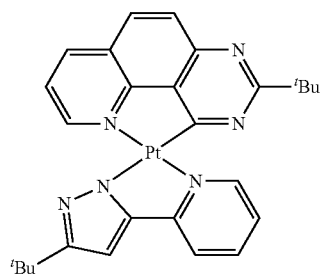
ID-30
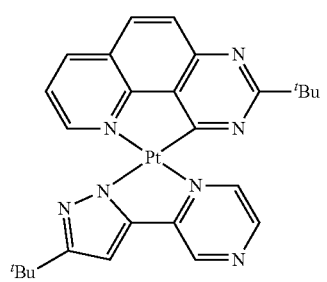
ID-31
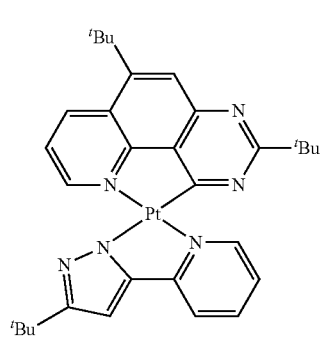
ID-32
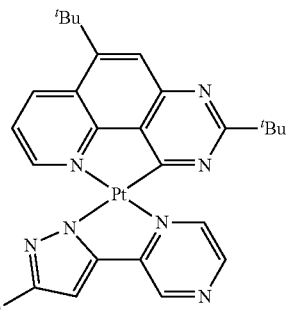
ID-33
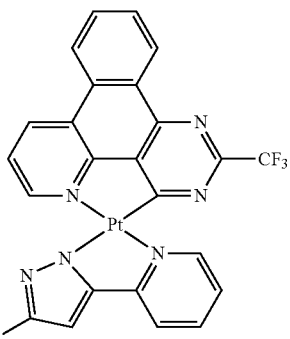
ID-34
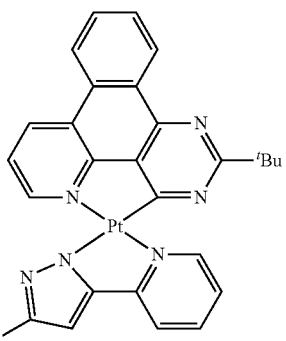
ID-35
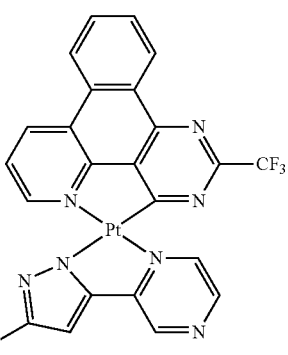

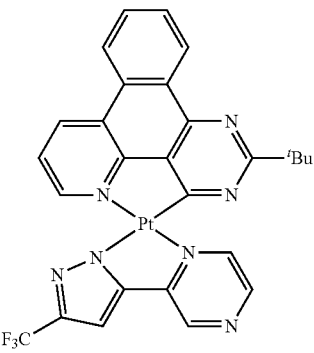

ID-36

In the invention, at least one inter-chelate C—H . . . N hydrogen bond is formed between two bidentate chelates of each of the structures shown in the (IA) to (ID) series of general formulas. Therefore, each of those complexes has better rigidity and planarity. This complex is easily stacked in solid state or as thin film, forming a well-aligned 1D linearly stacked structure, and also emits high-efficiency near-infrared emission after excitation.

The invention provides an apparatus for providing visible emission or near-infrared emission including the platinum complex above.

In an embodiment, the invention provides an organic light-emitting diode including two electrodes and a light-emitting layer disposed between the two electrodes. In an embodiment, the light-emitting layer contains only the abovementioned platinum complex, without incorporation of any host material. In another embodiment, as a special application, the platinum complex may also be used as a dopant. The materials of the two electrodes may be selected from common materials in the art, and other functional layers such as an electron-transport layer or a hole-injection layer, a hole-transport layer, or a hole-blocking layer may also be added between each electrode and the light-emitting layer according to techniques known in the art. The organic light-emitting diode may be fabricated on a flat substrate, such as a conductive glass or plastic substrate.

In an embodiment, a peak emission wavelength of the platinum complex of the invent is between about 550 nm and 1,000 nm, or more than about 1,000 nm. For example, the emission peak wavelength of the platinum complex of the invention is between about 550 nm to 1,000 nm, such as between 600 nm and 955 nm, which has a wide range of applications. More specifically, when the emission peak wavelength of the platinum complex of the invention is within the range of visible light, the platinum complex of the invention may be applied to fabrication of organic light-emitting diodes (OLED) for lighting and display applications. When the emission peak wavelength of the platinum complex of the invention is greater than 700 nm, it falls within the near-infrared regime, and the platinum complex of the invention may be used in military or medical fields to provide an invisible light source that is invisible to the naked eye or that may effectively penetrate the human body (or animal tissue). The emission peak wavelength of the platinum complex of the invention may be greater than 800 nm, and compared with a conventional platinum complex, the platinum complex of the invention has both higher efficiency and longer emission wavelength and, shows better penetration into the human body.

[Structure of Nitrogen-Containing Bidentate Chelate]

The invention provides a nitrogen-containing bidentate chelate having a structure represented by general formula (II):

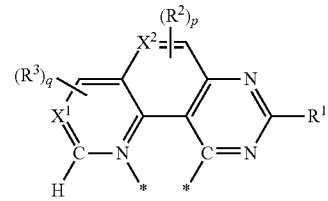

(II)

wherein * represents a bonding site; $X^1$ and $X^2$ are each independently carbon or nitrogen; $R^1$ is hydrogen, substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5; $R^2$ and $R^3$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3; p and q are each independently an integer of 1 to 2; when p is equal to 2, two $R^2$'s may join to form a $C_3$-$C_8$ aromatic or nitrogen-containing heteroaromatic ring; and when q is equal to 2, two $R^3$'s may join to form a $C_3$-$C_8$ aromatic or nitrogen-containing heteroaromatic ring.

[Synthesis of Nitrogen-Containing Bidentate Chelate]

The chelate used in the platinum complex of the invention has a 5-membered ring or a 6-membered ring, and the 5-membered ring or the 6-membered ring has a nitrogen atom or other highly electronegative atoms (such as fluorine, oxygen, or nitrogen). In an embodiment, the chelate used in the platinum complex of the invention may be selected from the group consisting of a chelate L1 to a chelate L13.

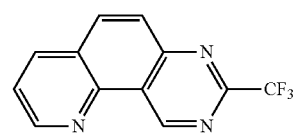

L1

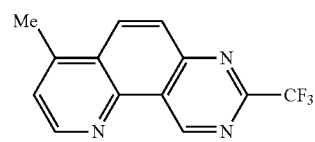

L2

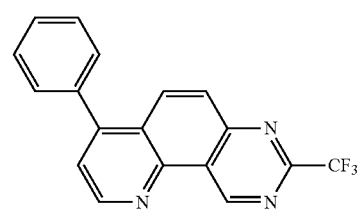

L3

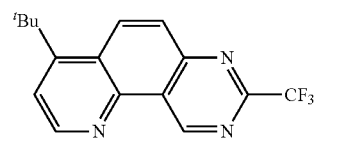

L4

-continued

L5 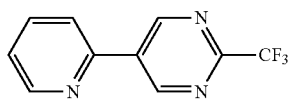

L6 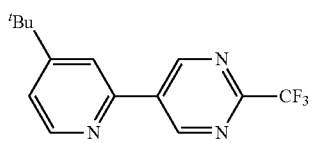

L7 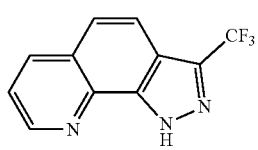

L8 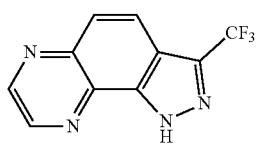

L9 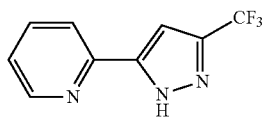

L10 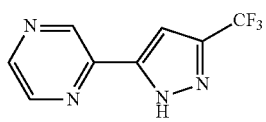

L11 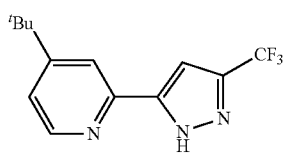

L12 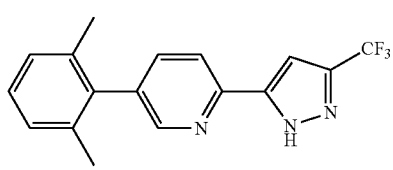

L13 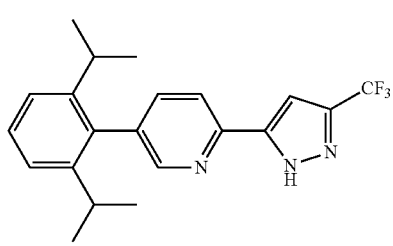

In an embodiment, the synthetic scheme S1 of the chelate L1 (pnazH) used in the platinum complex of the invention is as follows:

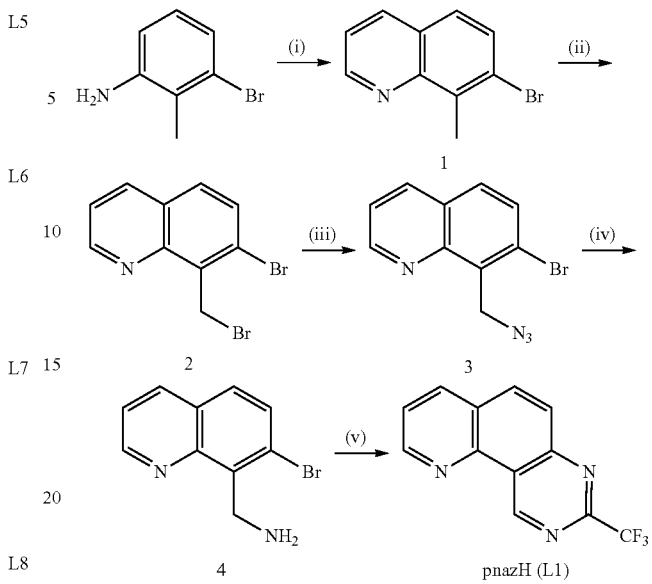

Experimental conditions of synthetic scheme S1: (i) glycerol, sodium 3-nitrobenzenesulfonate, $FeSO_4 \cdot 7\ H_2O$, MsOH, 160° C., 3 h. (ii) NBS, BPO, benzene, reflux, overnight. (iii) $NaN_3$, DMF, 80° C., overnight. (iv) $PPh_3$, $H_2O$, THF, RT, 2 h. (v) trifluoroacetamidine, CuI, $K_2CO_3$, 1,10-phenanthroline, DMSO, 100° C., 24 h.

Preparation of 7-bromo-8-methylquinoline (1) is shown as follows. A solution of 3-bromo-2-methylaniline (5 g, 26.9 mmol), sodium 3-nitrobenzenesulfonate (3.8 g, 16.9 mmol) and $FeSO_4 \cdot 7H_2O$ (220 mg, 0.81 mmol) in methanesulfonic acid (MsOH, 30 mL) was heated to 80° C. After then, glycerol (7.4 g, 80.6 mmol) was slowly added over a period of 2 h, and this mixture was heated to 160° C. for 3 h with stirring. The reaction mixture was poured onto crushed ice, basified to pH=9 with addition of NaOH(aq) and extracted into ethyl acetate (ethyl acetate). The organic phase was dried over $MgSO_4$ and concentrated in vacuo to yield a crude product. It was next purified by column chromatography (ethyl acetate/hexane=1:5) to afford a yellow solid (5.3 g, 90%).

Spectral data of a chelate precursor 1: $^1H$ NMR (400 MHz, $CDCl_3$, 298 K): δ 8.40 (dd, J=4.2, 1.4 Hz, 1H), 8.11 (dd, J=8.2, 1.6 Hz, 1H), 7.68 (d, J=8.8 Hz, 1H), 7.53 (d, J=8.8 Hz, 1H), 7.41 (dd, J=8.2, 4.2 Hz, 1H), 2.93 (s, 3H).

A mixture of chelate precursor 1 (2 g, 10.7 mmol), N-bromosuccinimide (NBS) (2.1 g, 11.8 mmol) and 75% benzoyl peroxide in water (BPO, 174 mg, 0.54 mmol) was added to benzene (35 mL) in a double-necked flask, and the solution was heated to reflux overnight. The reaction mixture was concentrated, and the residue was extracted into ethyl acetate. The organic phase was washed with water, dried over $MgSO_4$ and concentrated in vacuo. The crude product was purified by column chromatography (ethyl acetate/hexane=1:3) to afford a beige solid (2.6 g, 95%).

Spectral data of a chelate precursor 2: $^1H$ NMR (400 MHz, $CDCl_3$, 298 K): δ 9.02 (dd, J=4.2, 1.8 Hz, 1H), 8.15 (dd, J=8.3, 1.8 Hz, 1H), 7.72 (d, J=8.8 Hz, 1H), 7.66 (d, J=8.8 Hz, 1H), 7.47 (dd, J=8.3, 4.2 Hz, 1H), 5.42 (s, 2H).

Preparation of 8-(azidomethyl)-7-bromoquinoline (3) is shown as follows. A mixture of chelate precursor 2 (2.6 g, 8.5 mmol) and sodium azide ($NaN_3$) (1.7 g, 25.6 mmol) was dissolved in DMF (28 mL), and the mixture was heated to 80° C. and stirred overnight. The residue was extracted with ethyl acetate and washed with ice water. The combined organic phase was dried over MgSO₄ and concentrated. The crude product was purified by column chromatography (ethyl acetate/hexane=1:3) to afford a beige solid (2.2 g, 99%).

Spectral data of a chelate precursor 3: $^1$H NMR (400 MHz, CDCl$_3$, 298 K): δ 8.98 (dd, J=4.2, 1.7 Hz, 1H), 8.15 (dd, J=8.2, 1.7 Hz, 1H), 7.75 (d, J=8.8 Hz, 1H), 7.69 (d, J=8.8 Hz, 1H), 7.47 (dd, J=8.2, 4.2 Hz, 1H), 5.25 (s, 2H).

Preparation of (7-bromoquinolin-8-yl)methanamine (4) is shown as follows. A mixture of chelate precursor 3 (2.2 g, 8.4 mmol) and triphenylphosphine (PPh$_3$) (4.4 g, 16.7 mmol) was first dissolved in THF (30 mL). To this mixture was added water (3 mL), and the solution was stirred at RT for 2 hours. The residue was extracted into ethyl acetate, and the combined organic phase was washed with water, dried over MgSO₄ and concentrated in vacuo. The crude product was further purified by column chromatography (CH$_2$Cl$_2$/MeOH=20:1) to afford a brown oil (1.7 g, 88%).

Spectral data of a chelate precursor 4: $^1$H NMR (400 MHz, CDCl$_3$, 298 K): δ 8.93 (dd, J=4.2, 1.8 Hz, 1H), 8.11 (dd, J=8.2, 1.8 Hz, 1H), 7.67 (d, J=8.8 Hz, 1H), 7.57 (d, J=8.8 Hz, 1H), 7.42 (dd, J=8.2, 4.2 Hz, 1H), 4.61 (s, 2H).

Preparation of 8-(trifluoromethyl)pyrido[2,3-f]quinazoline) (pnazH, L1) is shown as follows. A mixture of chelate precursor 4 (850 mg, 3.6 mmol), trifluoroacetamidine (85%, 950 mg, 7.2 mmol), cuprous iodide CuI (68 mg, 0.4 mmol) and potassium carbonate K$_2$CO$_3$ (1.0 g, 7.2 mmol) in DMSO (15 mL) was heated to 100° C. for 24 h. After then, the mixture was exposed to air and heated for another 1 h. The mixture was cooled to RT and diluted with excess of saturated NH$_4$Cl(aq). The organic layer was extracted with ethyl acetate, washed with water, dried over MgSO₄ and concentrated in vacuo. The product was purified by column chromatography (ethyl acetate/hexane=1:3) and recrystallized from the CH$_2$Cl$_2$/hexane to afford a beige solid (530 mg, 59%). Single crystal X-ray structural analysis confirmed the expected tricyclic molecular structure.

Spectral data of the chelate L1: $^1$H NMR (500 MHz, CDCl$_3$, 298 K): δ 10.76 (s, 1H), 9.16 (dd, J=4.4, 1.8 Hz, 1H), 8.35 (dd, J=8.0, 1.7 Hz, 1H), 8.29 (d, J=9.1 Hz, 1H), 8.13 (d, J=9.1 Hz, 1H), 7.74 (dd, J=8.1, 4.4 Hz, 1H). $^{19}$F NMR (470 MHz, CDCl$_3$, 298 K): δ −69.71 (s, 3F). MS (FD) Calcd. for C$_{12}$H$_6$F$_3$N$_3$ [M+]: m/z: 249.1, Found: 249.0.

FIG. 1 shows the molecular structure of the chelate L1 of the invention. This proves that this multi-step synthetic method indeed affords the desired cyclometalating chelate.

In another embodiment, the synthetic scheme S2 of the chelate L2 (mpnazH) used in the platinum complex of the invention is as follows:

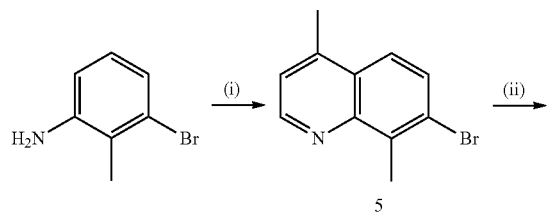

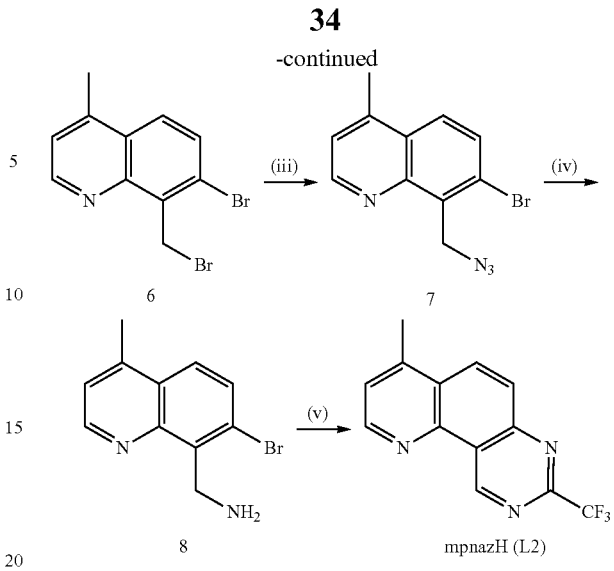

Experimental conditions of synthetic scheme S2: (i) methyl vinyl ketone, H$_2$SO$_4$, dioxane, reflux, 2 h. (ii) NBS, BPO, benzene, reflux, overnight. (iii) NaN$_3$, DMF, 80° C., overnight. (iv) PPh$_3$, H$_2$O, THF, RT, 2 h. (v) trifluoroacetamidine, CuI, K$_2$CO$_3$, 1,10-phenanthroline, DMSO, 100° C., 24 h.

Preparation of 7-bromo-4,8-dimethylquinoline (5) is shown as follows. A solution of 3-bromo-2-methylaniline (3 g, 16.1 mmol) in 1,4-dioxane (40 mL) was added conc. H$_2$SO$_4$ (2.4 g, 24.2 mmol) at RT. Next, the mixture was heated to reflux in air, while a solution of methyl vinyl ketone (2 mL, 24.2 mmol) in 1,4-dioxane (10 mL) was added dropwise and heated to reflux for 1 h, giving formation of a colorless precipitate. This precipitate was filtered, washed with acetone and, then, neutralized with saturated NaHCO$_{3(aq)}$ and extracted into an excess of ethyl acetate. The organic phase was dried over MgSO₄ and concentrated in vacuo to afford a white solid (2.6 g, 67%).

Spectral data of a chelate precursor 5: $^1$H NMR (400 MHz, CDCl$_3$, 298 K): δ 8.79 (d, J=4.4 Hz, 1H), 7.75-7.68 (m, 2H), 7.25 (d, J=4.3 Hz, 1H), 2.94 (s, 3H), 2.69 (s, 3H).

Preparation of 7-bromo-8-(bromomethyl)-4-methylquinoline (6) is shown as follows. Chelate precursor 6 was prepared following the same method as for chelate precursor 2. It was next purified by column chromatography (ethyl acetate/hexane=1:3) to afford a yellow solid (97%).

Spectral data of a chelate precursor 6: $^1$H NMR (400 MHz, CDCl$_3$, 298 K): δ 8.86 (d, J=4.4 Hz, 1H), 7.85 (d, J=9.0 Hz, 1H), 7.72 (d, J=9.0 Hz, 1H), 7.30 (dd, J=2.2, 0.9 Hz, 1H), 5.43 (s, 2H), 2.70 (s, 3H).

Preparation of 8-(azidomethyl)-7-bromo-4-methylquinoline (7) is shown as follows. Chelate precursor 7 was prepared following the same method as for chelate precursor 3. It was next purified by column chromatography (ethyl acetate/hexane=1:3) to afford a brown solid (97%).

Spectral data of a chelate precursor 7: $^1$H NMR (400 MHz, CDCl$_3$, 298 K): δ 8.82 (d, J=4.3 Hz, 1H), 7.88 (d, J=9.0 Hz, 1H), 7.75 (d, J=9.0 Hz, 1H), 7.29 (dd, J=2.2, 0.8 Hz, 1H), 5.25 (s, 2H), 2.71 (s, 3H).

Preparation of (7-bromo-4-methylquinolin-8-yl)methanamine (8) is shown as follows. Chelate precursor 8 was prepared following the same method as for chelate precursor 4. It was next purified by column chromatography (CH$_2$Cl$_2$/MeOH=20:1) to afford a brown oil (90%).

Spectral data of a chelate precursor 8: $^1$H NMR (400 MHz, CDCl$_3$, 298 K): δ 8.78 (d, J=4.4 Hz, 1H), 7.76 (d, J=9.0 Hz, 1H), 7.68 (d, J=9.0 Hz, 1H), 7.27-7.25 (m, 1H), 4.61 (s, 2H), 2.69 (s, 3H).

Preparation of 4-methyl-8-(trifluoromethyl)pyrido[2,3-f] quinazoline (mpnazH) is shown as follows. This compound was prepared following the same method as for synthesis of pnazH. The product was purified by column chromatography (ethyl acetate/hexane=1:3) and recrystallized from the CH$_2$Cl$_2$/hexane to afford a beige solid (58%).

Spectral data of chelate L2: $^1$H NMR (500 MHz, CDCl$_3$, 298 K): δ 10.77 (s, 1H), 9.00 (d, J=4.3 Hz, 1H), 8.52 (d, J=9.2 Hz, 1H), 8.15 (d, J=9.2 Hz, 1H), 7.56 (d, J=5.5 Hz, 1H), 2.84 (s, 3H). $^{19}$F NMR (470 MHz, CDCl$_3$, 298 K): δ −69.71 (s, 3F). MS (FD) Calcd. for C$_{13}$H$_8$F$_3$N$_3$ [M$^+$]: m/z: 263.1, Found: 263.1.

In yet another embodiment, the synthetic scheme S3 of chelate L3 (ppnazH) used in the platinum complex of the invention is as follows:

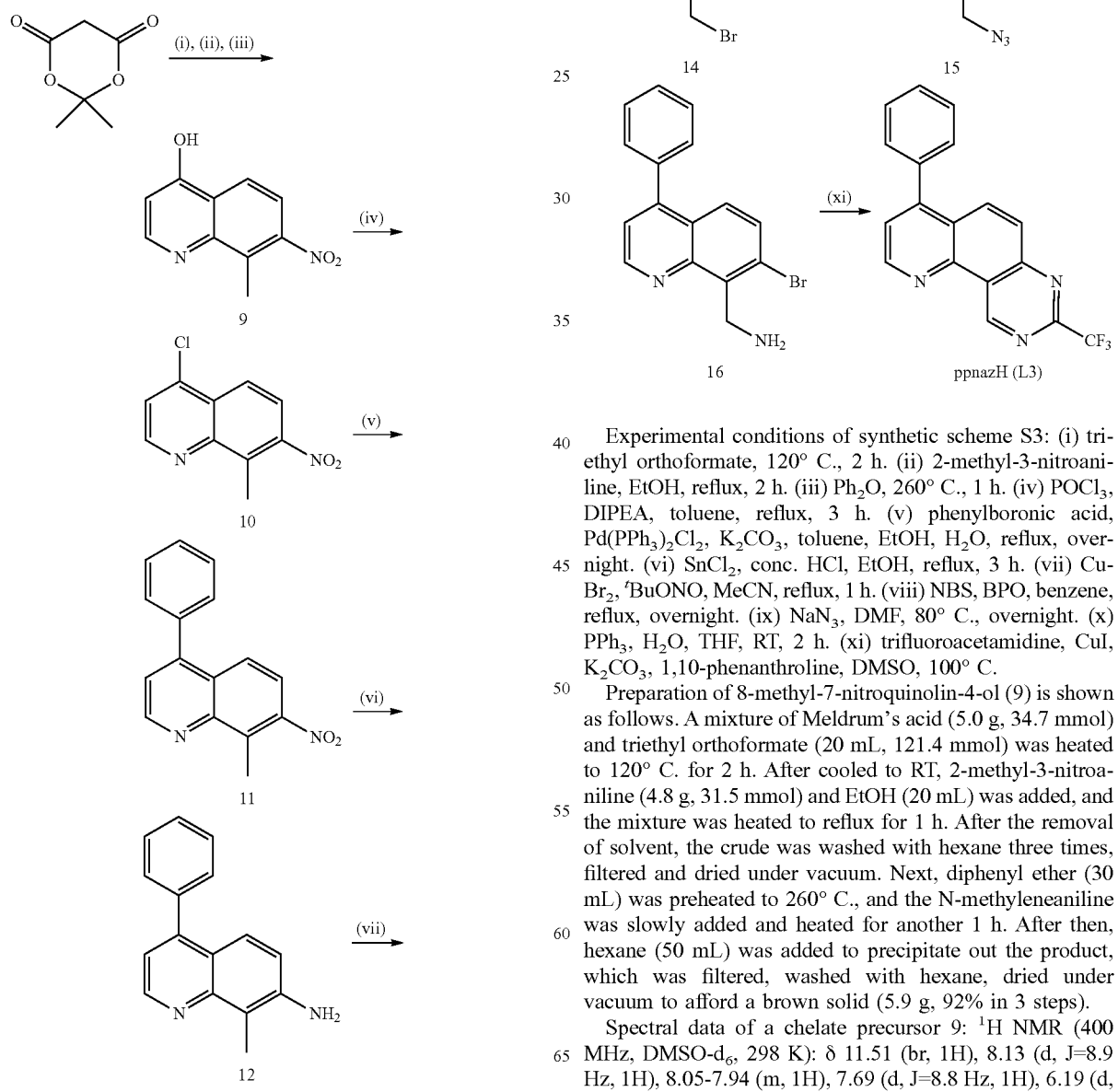

Experimental conditions of synthetic scheme S3: (i) triethyl orthoformate, 120° C., 2 h. (ii) 2-methyl-3-nitroaniline, EtOH, reflux, 2 h. (iii) Ph$_2$O, 260° C., 1 h. (iv) POCl$_3$, DIPEA, toluene, reflux, 3 h. (v) phenylboronic acid, Pd(PPh$_3$)$_2$Cl$_2$, K$_2$CO$_3$, toluene, EtOH, H$_2$O, reflux, overnight. (vi) SnCl$_2$, conc. HCl, EtOH, reflux, 3 h. (vii) CuBr$_2$, $^t$BuONO, MeCN, reflux, 1 h. (viii) NBS, BPO, benzene, reflux, overnight. (ix) NaN$_3$, DMF, 80° C., overnight. (x) PPh$_3$, H$_2$O, THF, RT, 2 h. (xi) trifluoroacetamidine, CuI, K$_2$CO$_3$, 1,10-phenanthroline, DMSO, 100° C.

Preparation of 8-methyl-7-nitroquinolin-4-ol (9) is shown as follows. A mixture of Meldrum's acid (5.0 g, 34.7 mmol) and triethyl orthoformate (20 mL, 121.4 mmol) was heated to 120° C. for 2 h. After cooled to RT, 2-methyl-3-nitroaniline (4.8 g, 31.5 mmol) and EtOH (20 mL) was added, and the mixture was heated to reflux for 1 h. After the removal of solvent, the crude was washed with hexane three times, filtered and dried under vacuum. Next, diphenyl ether (30 mL) was preheated to 260° C., and the N-methyleneaniline was slowly added and heated for another 1 h. After then, hexane (50 mL) was added to precipitate out the product, which was filtered, washed with hexane, dried under vacuum to afford a brown solid (5.9 g, 92% in 3 steps).

Spectral data of a chelate precursor 9: $^1$H NMR (400 MHz, DMSO-d$_6$, 298 K): δ 11.51 (br, 1H), 8.13 (d, J=8.9 Hz, 1H), 8.05-7.94 (m, 1H), 7.69 (d, J=8.8 Hz, 1H), 6.19 (d, J=7.4 Hz, 1H), 2.53 (s, 3H).

Preparation of 4-chloro-8-methyl-7-nitroquinoline) (10) is shown as follows. To a suspension of chelate precursor 9 (5 g, 24.5 mmol) in dry toluene (100 mL), POCl$_3$ (6.9 mL, 73.5 mmol) and N,N-diisopropylethylamine (DIPEA, 4.3 mL, 24.5 mmol) were slowly added in sequence. After heated to reflux for 3 h, the mixture was cooled to RT and quenched with crushed ice, to which the pH was adjusted to 9 with NaOH$_{(aq)}$ and, then, extracted with ethyl acetate. The organic phase was dried over MgSO$_4$ and concentrated in vacuo to afford a crude product, which was further purified by column chromatography (ethyl acetate/hexane=1:5) to afford a yellow solid (4.8 g, 80%).

Spectral data of a chelate precursor 10: $^1$H NMR (400 MHz, CDCl$_3$, 298 K): δ 8.93 (d, J=4.6 Hz, 1H), 8.23 (d, J=9.2 Hz, 1H), 7.99 (d, J=9.2 Hz, 1H), 7.64 (d, J=4.6 Hz, 1H), 3.02 (s, 3H).

Preparation of 8-methyl-7-nitro-4-phenylquinoline) (11) is shown as follows. A mixture of chelate precursor 10 (2.5 g, 11.2 mmol), phenylboronic acid (1.8 g, 14.6 mmol), Pd(PPh$_3$)$_2$Cl$_2$ (394 mg, 0.56 mmol) and K$_2$CO$_3$ (3.1 g, 22.5 mmol) in degassed mixture of toluene (32 mL), EtOH (9 mL) and water (9 mL) was heated to reflux overnight. After removal of solvents, the residue was extracted with ethyl acetate and washed with water in sequence. The combined organic phase was dried over MgSO$_4$ and concentrated, and the crude product was purified by column chromatography (ethyl acetate/hexane=1:3) to afford a white solid (2.6 g, 88%).

Spectral data of a chelate precursor 11: $^1$H NMR (400 MHz, CDCl$_3$, 298 K): δ 9.09 (d, J=4.3 Hz, 1H), 7.89-7.82 (m, 2H), 7.59-7.52 (m, 3H), 7.50-7.45 (m, 3H), 3.07 (s, 3H).

Preparation of 8-methyl-4-phenylquinolin-7-amine) (12) is shown as follows. To a mixture of chelate precursor 11 (4 g, 15.1 mmol) and anhydrous SnCl$_2$ (11.5 g, 60.3 mmol) in EtOH (40 mL) was added conc. HCl (30 mL). After heated to reflux for 3 h, the reaction mixture was poured onto crushed ice, and the pH was adjusted to 9 with addition of 4M NaOH$_{(aq)}$ solution. The solution was extracted with ethyl acetate, and the resulting organic layer was dried over MgSO$_4$ and concentrated in vacuo to yield a crude product. It was next purified by column chromatography (ethyl acetate/hexane=1:1) to afford a white solid (3.5 g, 98%).

Spectral data of a chelate precursor 12: $^1$H NMR (400 MHz, CDCl$_3$, 298 K): δ 8.84 (d, J=4.4 Hz, 1H), 7.60 (d, J=9.0 Hz, 1H), 7.53-7.45 (m, 5H), 7.09 (d, J=4.4 Hz, 1H), 6.96 (d, J=8.9 Hz, 1H), 2.65 (s, 3H).

Preparation of 7-bromo-8-methyl-4-phenylquinoline (13) is shown as follows. To a mixture of chelate precursor 12 (2.7 g, 11.5 mmol) and CuBr$_2$ (3.1 g, 13.8 mmol) in MeCN (40 mL) was added tert-butyl nitrite (3 mL, 23 mmol) dropwise, and the reaction mixture was heated to reflux for 1 h until the evolution of gas ceased. After then, the reaction mixture was taken into ethyl acetate, washed with saturated NaHCO$_3$(aq) (40 mL) and water in sequence. The organic layer was dried over MgSO$_4$ and concentrated, and the product was purified by column chromatography (ethyl acetate/hexane=1:7) to afford a brown solid (2.1 g, 60%).

Spectral data of a chelate precursor 13: $^1$H NMR (400 MHz, CDCl$_3$, 298 K): δ 8.94 (d, J=4.4 Hz, 1H), 7.62 (s, 2H), 7.54-7.49 (m, 3H), 7.48-7.45 (m, 2H), 7.35 (d, J=4.4 Hz, 1H), 2.99 (s, 3H).

Preparation of 7-bromo-8-(bromomethyl)-4-phenylquinoline (14) is shown as follows. Chelate precursor 14 was prepared following the same method as for chelate precursor 2. The product was purified by column chromatography (ethyl acetate/hexane=1:7) to afford an orange solid (93%).

Spectral data of a chelate precursor 14: $^1$H NMR (400 MHz, CDCl$_3$, 298 K): δ 9.03 (d, J=4.4 Hz, 1H), 7.75 (d, J=9.1 Hz, 1H), 7.65 (d, J=9.1 Hz, 1H), 7.55-7.51 (m, 3H), 7.48-7.43 (m, 2H), 7.40 (d, J=4.4 Hz, 1H), 5.48 (s, 2H).

Preparation of 8-(Azidomethyl)-7-bromo-4-phenylquinoline (15) is shown as follows. Chelate precursor 15 was prepared following the same method as for chelate precursor 3. It was purified by column chromatography (ethyl acetate/hexane=1:7) to afford a yellow solid (99%).

Spectral data of a chelate precursor 15: $^1$H NMR (400 MHz, CDCl$_3$, 298 K): δ 8.99 (d, J=4.4 Hz, 1H), 7.79 (d, J=9.1 Hz, 1H), 7.68 (d, J=9.1 Hz, 1H), 7.56-7.50 (m, 3H), 7.49-7.45 (m, 2H), 7.40 (d, J=4.4 Hz, 1H), 5.30 (s, 2H).

Preparation of (7-bromo-4-phenylquinolin-8-yl)methanamine (16) is shown as follows. Chelate precursor 16 was prepared following the same method as for chelate precursor 4. The product was further purified by column chromatography (CH$_2$Cl$_2$/MeOH=20:1) to afford a brown oil (98%).

Spectral data of a chelate precursor 16: $^1$H NMR (400 MHz, CDCl$_3$, 298 K): δ 8.95 (d, J=4.3 Hz, 1H), 7.66 (d, J=9.1 Hz, 1H), 7.60 (d, J=9.1 Hz, 1H), 7.55-7.49 (m, 3H), 7.47-7.43 (m, 2H), 7.36 (d, J=4.4 Hz, 1H), 4.66 (s, 2H).

Preparation of 4-phenyl-8-(trifluoromethyl)pyrido[2,3-f]quinazoline (ppnazH) is shown as follows. This compound was prepared following the same method as for synthesis of pnazH. The product was purified by column chromatography (ethyl acetate/hexane=1:5) and recrystallized from a mixture of CH$_2$Cl$_2$/hexane to afford a beige solid (48%).

Spectral data of chelate L3: $^1$H NMR (500 MHz, CDCl$_3$, 298 K): δ 10.83 (s, 1H), 9.17 (d, J=4.3 Hz, 1H), 8.41 (d, J=9.6 Hz, 1H), 8.07 (d, J=9.4 Hz, 1H), 7.67 (d, J=4.7 Hz, 1H), 7.60-7.57 (m, 3H), 7.54-7.52 (m, 2H). $^{19}$F NMR (470 MHz, CDCl$_3$, 298 K): δ −69.71 (s, 3F). MS (FD) Calcd. for C$_{18}$H$_{10}$F$_3$N$_3$ [M$^+$]: m/z: 325.1, Found: 325.0.

In another embodiment, the synthetic scheme S4 of the chelate L4 (5tpnazH) used in the platinum complex of the invention is as follows:

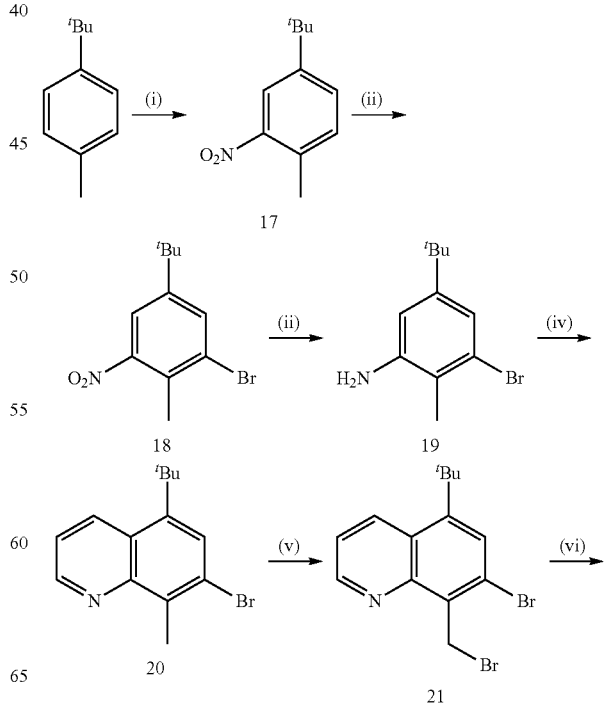

-continued

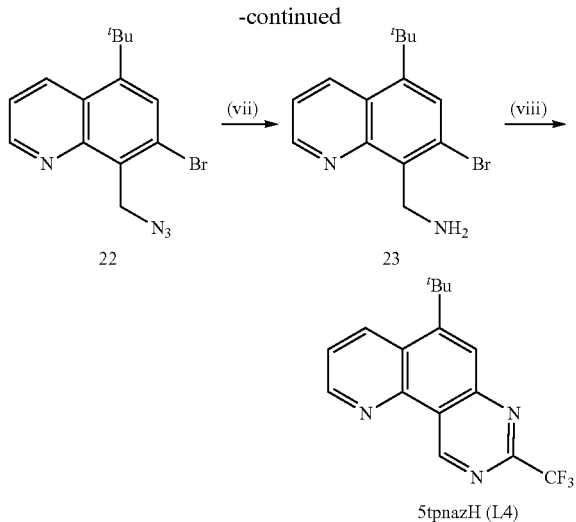

Experimental conditions of synthetic scheme S4: (i) HNO$_3$, AcOH, Ac$_2$O, 0° C., 1 h. (ii) NBS, H$_2$SO$_4$, TFA, 50° C., 16 h. (iii) SnCl$_2$, conc. HCl, EtOH, reflux, 3 h. (iv) glycerol, sodium 3-nitrobenzenesulfonate, FeSO$_4$.7 H$_2$O, MsOH, 160° C., 16 h. (v) NBS, BPO, benzene, reflux, overnight. (vi) NaN$_3$, DMF, 80° C., overnight. (vii) PPh$_3$, H$_2$O, THF, RT, 2 h. (viii) trifluoroacetamidine, CuI, K$_2$CO$_3$, 1,10-phenanthroline, DMSO, 100° C.

Preparation of 4-(tert-butyl)-1-methyl-2-nitrobenzene (17) is shown as follows. Acetic acid (17 ml) was slowly dropped into ice-cooled fuming nitric acid (10 ml) then stirred 10 min. The mixed acid was next added dropwise via additional funnel to a solution of 4-tert-butyltoluene (10.0 g, 67.5 mmol) in Ac$_2$O (200 ml) at 0° C., and then stirred at same temperature for 1 h. The reaction mixture was poured onto crushed ice and extracted with hexane several times, the extracts was carefully neutralized with 2 M NaOH$_{(aq)}$. The organic layer was dried over MgSO$_4$ and concentrated, and the product was purified by column chromatography (CH$_2$Cl$_2$/hexane=1:10) to afford a yellow oil (12.1 g, 93%).

Spectral data of a chelate precursor 17: $^1$H NMR (400 MHz, CDCl$_3$, 298 K): δ 7.97 (d, J=2.1 Hz, 1H), 7.51 (dd, J=8.0, 2.1 Hz, 1H), 7.26 (d, J=8.0 Hz, 1H), 2.56 (s, 3H), 1.34 (s, 9H).

Preparation of 1-bromo-5-(tert-butyl)-2-methyl-3-nitrobenzene (18) is shown as follows. A solution of chelate precursor 17 (11.5 g, 59.6 mmol) in TFA (36 ml) and H$_2$SO$_4$ (11.5 ml) was added NBS (21.2 g, 119 mmol) in portions. The solution was stirred at 60° C. for 16 h. The reaction mixture was poured onto iced water and extracted with EtOAc. The extracts were neutralized with 2 M NaOH$_{(aq)}$. The organic layer was dried over MgSO$_4$ and concentrated, and the product was purified by column chromatography (CH$_2$Cl$_2$/hexane=1:9) to afford a yellow oil (14 g, 86%).

Spectral data of a chelate precursor 18: $^1$H NMR (400 MHz, CDCl$_3$, 298 K): δ 7.78 (d, J=2.0 Hz, 1H), 7.70 (d. J=2.2 Hz, 1H), 2.52 (s, 3H), 1.33 (s, 9H).

Preparation of 3-bromo-5-(tert-butyl)-2-methylaniline (19) is shown as follows. Chelate precursor 19 was prepared following the same method as for chelate precursor 12. The product was purified by column chromatography (ethyl acetate/hexane=1:7) to afford a yellow oil (84%).

Spectral data of a chelate precursor 19: $^1$H NMR (400 MHz, CDCl$_3$, 298 K): δ 7.02 (d, J=1.9 Hz, 1H), 6.64 (d, J=1.9 Hz, 1H), 3.68 (br, 2H), 2.24 (s, 3H), 1.26 (s, 9H).

Preparation of 7-bromo-5-(tert-butyl)-8-methylquinoline (20) is shown as follows. Chelate precursor 20 was prepared following the same method as for chelate precursor 1. The product was purified by column chromatography (CH$_2$Cl$_2$/hexane=1:9) to afford a yellow solid (52%).

Spectral data of a chelate precursor 20: $^1$H NMR (400 MHz, CDCl$_3$, 298 K): δ 8.90 (dd, J=4.2, 1.4 Hz, 1H), 8.75 (dd, J=8.7, 1.4 Hz, 1H), 7.66 (s, 1H), 7.40 (dd, J=8.7, 4.2 Hz, 1H), 2.90 (s, 3H), 1.59 (s, 9H).

Preparation of 7-bromo-8-(bromomethyl)-5-(tert-butyl)quinoline (21) is shown as follows. Chelate precursor 21 was prepared following the same method as for chelate precursor 2. The product was purified by column chromatography (CH$_2$Cl$_2$/hexane=1:9) to afford a pink solid (96%).

Spectral data of a chelate precursor 21: $^1$H NMR (400 MHz, CDCl$_3$, 298 K): δ 8.97 (dd, J=4.1, 1.6 Hz, 1H), 8.77 (dd, J=8.8, 1.6 Hz, 1H), 7.69 (s, 1H), 7.45 (dd, J=8.8, 4.1 Hz, 1H), 5.40 (s, 2H), 1.60 (s, 9H).

Preparation of 8-(azidomethyl)-7-bromo-5-(tert-butyl)quinoline (22) is shown as follows. Chelate precursor 22 was prepared following the same method as for chelate precursor 3. The product was purified by column chromatography (CH$_2$Cl$_2$/hexane=1:7) to afford a yellow oil (94%).

Spectral data of a chelate precursor 22: $^1$H NMR (400 MHz, CDCl$_3$, 298 K): δ 8.94 (dd, J=4.0, 1.4 Hz, 1H), 8.78 (dd, J=8.8, 1.4 Hz, 1H), 7.72 (s, 1H), 7.45 (dd, J=8.8, 4.0 Hz, 1H), 5.21 (s, 2H), 1.61 (s, 9H).

Preparation of (7-bromo-5-(tert-butyl)quinolin-8-yl) methanamine (23) is shown as follows. Chelate precursor 23 was prepared following the same method as for chelate precursor 4. The product was purified by column chromatography (CH$_2$Cl$_2$/MeOH=20:1) to afford a yellow oil (92%).

Spectral data of a chelate precursor 23: $^1$H NMR (400 MHz, CDCl$_3$, 298 K): δ 8.90 (dd, J=4.0, 1.6 Hz, 1H), 8.76 (dd, J=8.8, 1.6 Hz, 1H), 7.65 (s, 1H), 7.42 (dd, J=8.8, 4.0 Hz, 1H), 4.57 (s, 2H), 1.59 (s, 9H).

Preparation of 5-(tert-butyl)-8-(trifluoromethyl)pyrido[2,3-f]quinazoline (5tpnazH) is shown as follows. This compound was prepared following the same method as for synthesis of pnazH. The product was purified by column chromatography (ethyl acetate/hexane=1:9) to afford an orange solid (48%).

Spectral data of the chelate L4: $^1$H NMR (500 MHz, CDCl$_3$, 298 K): δ 10.67 (s, 1H), 9.11 (dd, J=4.3, 1.6 Hz, 1H), 8.95 (dd. J=8.6, 1.6 Hz), 8.13 (s, 1H), 7.71 (dd, J=8.6, 4.3 Hz, 1H), 1.71 (s, 9H). $^{19}$F NMR (470 MHz, CDCl$_3$, 298 K): δ −69.74 (s, 3F). MS (FD) Calcd. for C$_{16}$H$_{14}$F$_3$N$_3$ [M$^+$]: m/z: 305.1, Found: 305.1.

[Synthesis of Platinum Complex]

The platinum complex of the invention may be prepared by the following one-step method:

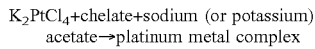

K$_2$PtCl$_4$+chelate+sodium (or potassium) acetate→platinum metal complex

The specific method thereof includes the following steps: a chelate, sodium (or potassium) acetate, and a platinum source were mixed, and the mixture was heated to reflux in a suitable solvent (for example, pivalic acid or other high-boiling carboxylic acids). After the reaction was completed, the crude product was purified by filtration, trituration with water, and sublimation to obtain the platinum metal complex of the invention.

The second method is a two-step synthetic method:

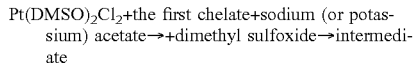

Pt(DMSO)$_2$Cl$_2$+the first chelate+sodium (or potassium) acetate→+dimethyl sulfoxide→intermediate

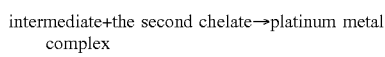

intermediate+the second chelate→platinum metal complex

The specific method thereof includes the following steps: one equivalent of the first chelate, sodium (or potassium) acetate, and a platinum source were mixed, and after heating to reflux in anhydrous toluene for 24 hours, dimethyl sulfoxide solvent was added to the mixture and the mixture was heated at 80° C. for 24 hours to obtain an intermediate; then the second chelate was added and the mixture was heated to reflux in glacial acetic acid. After the reaction was completed, the crude product was purified by filtration trituration with water, and sublimation to obtain the platinum metal complex of the invention.

The platinum complex of the invention may be prepared by selecting suitable reactants and reaction conditions according to the inherent properties of each chelate, and the preparation procedures may be changed according to techniques known in the art, which are not repeated herein.

EXAMPLES

Hereinafter, the invention is further described with several examples, but the examples are only for illustrative purposes and are not used to limit the scope of the invention. The platinum complexes represented by formulas (IA-1), (IA-2), (IA-3) . . . or (IB-1), (IB-2), (IB-3) . . . or (IC-1), (IC-2), (IC-3) . . . or (ID-1), (ID-2), (ID-3) . . . are hereinafter abbreviated as complexes (IA-1), (IA-2), (IA-3) . . . or (IB-1), (IB-2), (IB-3) . . . or (IC-1), (IC-2), (IC-3) . . . or (ID-1), (ID-2), (ID-3) . . . . The corresponding abbreviations are also applied to platinum complexes bearing chemical formulas as indicated below.

Example 1

Preparation of Complex (IA-1):

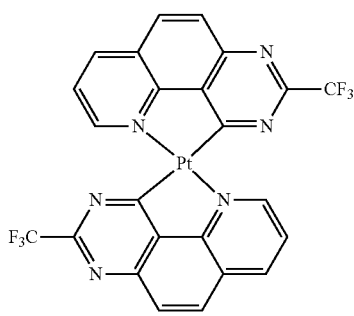

(IA-1)

$K_2PtCl_4$ (300 mg, 0.7 mmol), the chelate L1 (378 mg, 1.5 mmol), and potassium acetate (2.85 g, 29.1 mmol) were added to a single-necked reaction flask. The flask was purged with nitrogen several times and, then, pivalic acid (PivOH, 30 mL) was added, and the mixture was heated to reflux for 72 hours. After the reaction was completed, the solvent was removed under vacuum, and the solid was dispersed in a mixture of acetone and water and the resulting suspension was stirred for several minutes. The solid was collected by suction filtration and washed with acetone and water multiple times. The crude product was purified by sublimation ($10^{-5}$ mmHg, 360° C. to 380° C.) to obtain 430 mg of a black solid with a yield of 86%.

$^1$H and $^{19}$F NMR spectra cannot be obtained due to poor solubility. MS (EI) Calcd. for $C_{24}H_{10}F_6N_6Pt$ [M$^+$]: m/z: 691.1, Found: 691.1. Anal. Calcd. for $C_{24}H_{10}F_6N_6Pt$: C, 41.69; H, 1.46; N, 12.15, Found: C, 41.74; H, 1.50; N, 11.77.

Example 2

Preparation of Complex (IA-2):

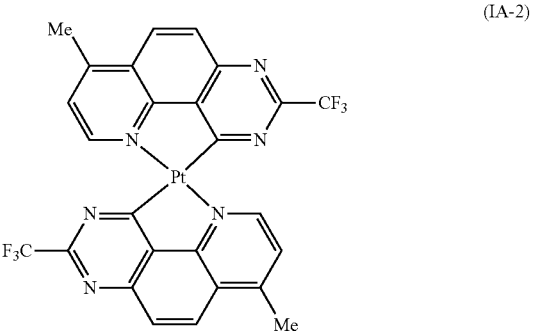

(IA-2)

The experimental steps were the same as those of complex (IA-1), but L2 was used as the chelate. The sample was purified by vacuum sublimation under a base pressure of $10^{-5}$ mmHg at 360~380° C. to obtain a greyish green solid with a yield of 90%

$^1$H NMR and $^{19}$F spectra may not be obtained due to poor solubility. MS (EI) Calcd. for $C_{26}H_{14}F_6N_6Pt$ [M$^+$]: m/z: 719.1, Found: 719.1. Anal. Calcd. for $C_{26}H_{14}F_6N_6Pt$: C, 43.40; H, 1.96; N, 11.68, Found: C, 43.75; H, 2.07; N, 11.73.

Example 3

Preparation of Complex (IA-3):

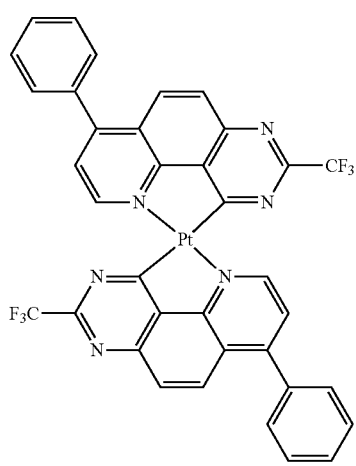

(IA-3)

The experimental steps were the same as those of complex (IA-1), but L3 was used as the chelate. The sample was purified by vacuum sublimation under a base pressure of $10^{-5}$ mmHg at 400~420° C. to obtain a yellowish green solid with a yield of 780%.

$^1$H and $^{19}$F NMR spectra cannot be obtained due to poor solubility. MS (EI) Calcd. for $C_{36}H_{18}F_6N_6Pt$ [M$^+$]: m/z: 843.1, Found: 843.1. Anal. Calcd. for $C_{36}H_{18}F_6N_6Pt$: C, 51.25; H, 2.15; N, 9.96, Found: C, 51.25; H, 2.23; N, 9.78.

Example 4

Preparation of Complex (IA-4):

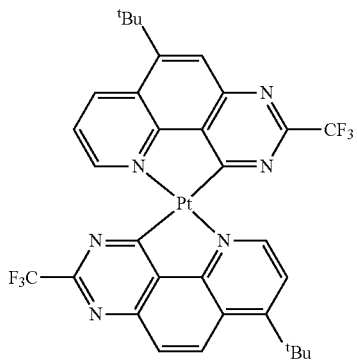

(IA-4)

The experimental steps were the same as those of complex (IA-1), but L4 was used as the chelate. After the reaction was completed, the solvent was first removed with a vacuum system, then extraction was performed twice with dichloromethane and water, and then the organic layer was collected and treated with anhydrous sodium sulfate. The solution was filtered and the filtrate was concentrated under reduced pressure and, the residue was separated by column chromatography ($SiO_2$, DCM/MeOH=20:1) to obtain a bluish green solid. After purification by sublimation ($10^{-5}$ mmHg, 300° C. to 320° C.), a deep red solid was obtained with a yield of 70%.

Spectral data of complex (IA-4): $^1$H NMR (500 MHz, $CD_2Cl_2$, 298 K): δ 10.84 (d, J=4.3 Hz, 2H), 8.72 (d, J=8.4 Hz, 2H), 7.51 (s, 2H), 7.46-7.44 (m, 2H), 1.69 (s, 18H). $^{19}$F NMR (470 MHz, $CD_2Cl_2$, 298 K): δ −69.34 (s, 6F). MS (FD) Calcd. for $C_{32}H_{26}F_6N_6Pt$ [M$^+$]: m/z: 803.2, Found: 803.2. Anal. Calcd. for $C_{32}H_{26}F_6N_6Pt$: C, 47.82; H, 3.26; N, 10.46, Found: C, 47.80; H, 3.23; N, 10.19.

Example 5

Preparation of Intermediate Pt(L1)(DMSO)Cl or Pt(pnaz)(DMSO)Cl:

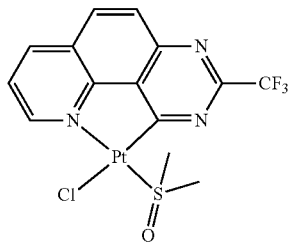

A mixture of pnazH (236 mg, 0.9 mmol), sodium acetate (39 mg, 0.5 mmol) and cis-[Pt(DMSO)$_2$Cl$_2$] (200 mg, 0.5 mmol) in 6 mL of toluene was refluxed for 24 h under $N_2$. The mixture was concentrated, the residue was extracted into 30 mL of $CH_2Cl_2$ and washed with deionized water. The resulting $CH_2Cl_2$ solution was dried over anhydrous $Na_2SO_4$, filtered, and concentrated to give a brown powder. To this brown powder was added 6 mL of dimethyl sulfoxide (DMSO), and the mixture was heated at 80° C. for 24 h. After cooled to RT, excess of water was added, and the content extracted into $CH_2Cl_2$ solution. The organic layer was separated, washed with water twice, dried over $Na_2SO_4$, filtered, and concentrated to dryness. Finally, it was purified by column chromatography ($CH_2Cl_2$/MeOH=20:1) to give Pt(pnaz)(DMSO)Cl (203 mg, 76%) as a yellow solid.

Spectral data of intermediate Pt(pnaz)(DMSO)Cl: $^1$H NMR (500 MHz, acetone-d$_6$, 298 K): δ 9.99 (d, J=5.1 Hz, $J_{PtH}$=28 Hz, 1H), 8.99 (d, J=8.1 Hz, 1H), 8.54 (d, J=9.0 Hz, 1H), 8.17 (td, J=6.7, 2.6 Hz, 1H), 8.07 (d, J=9.0 Hz, 1H), 3.86 (s, $J_{PtH}$=27 Hz, 6H). $^{19}$F NMR (470 MHz, acetone-d$_6$, 298 K): δ −70.41 (s, 3F).

Example 6

Preparation of Intermediate Pt(L4)(DMSO)Cl:

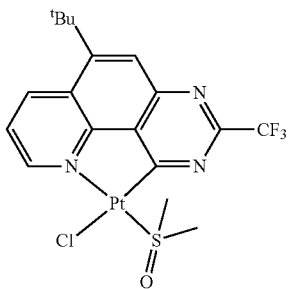

This complex was synthesized similarly to Pt(pnaz)(DMSO)Cl from 5tpnazH; yield: 70% as a yellow solid.

Spectral data of the intermediate Pt(L4)(DMSO)Cl: $^1$H NMR (500 MHz, acetone-d$_6$, 298 K): δ 10.05 (dd, J=5.5, 1.1 Hz, $J_{PtH}$=33 Hz, 1H), 9.48 (dd, J=8.6, 1.2 Hz, 1H), 8.15 (q, J=4.7 Hz, 1H), 7.98 (s, 1H), 3.84 (s, $J_{PtH}$=28 Hz, 6H), 1.76 (s, 9H). $^{19}$F NMR (470 MHz, acetone-d$_6$, 298 K): δ −70.44 (s, 3F).

Example 7

Preparation of Complex (IB-1):

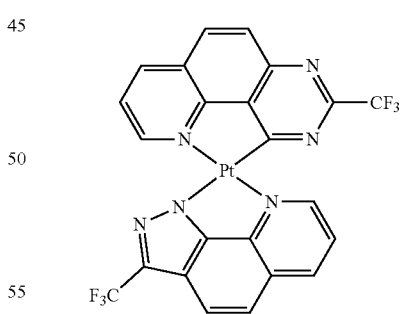

(IB-1)

The intermediate Pt(pnaz)(DMSO)Cl (150 mg, 0.3 mmol), the chelate L7 (70 mg, 0.3 mmol), and sodium acetate (66 mg, 0.8 mmol) were added to a single-necked flask, then the flask was purged with nitrogen several times, glacial acetic acid (6 mL) was added, and the mixture was heated to reflux for 12 hours. After the reaction was completed, the solvent was first removed by a vacuum system, and then acetone and water were added and stirring was performed vigorously for several minutes. Then, the solid was collected by suction filtration and washed with acetone and water multiple times. The crude product was purified by sublimation ($10^{-5}$ mmHg, 330° C. to 350° C.) to obtain 140 mg of a greyish green solid with a yield of 82%.

Spectral data of complex (IB-1): $^1$H NMR (500 MHz, DMSO-$d_6$, 353 K): δ 9.45 (d, J=4.2 Hz, 1H), 9.02 (d, J=3.2 Hz, 1H), 8.90 (d, J=9.1 Hz, 1H), 8.53 (d, J=8.2 Hz, 1H), 8.43 (d, J=8.9 Hz, 1H), 8.08 (s, 1H), 8.00 (d, J=8.8 Hz, 1H), 7.85 (d, J=8.8 Hz, 1H), 7.78-7.72 (m, 2H). $^{19}$F NMR (470 MHz, DMSO-$d_6$, 353 K): δ −59.10 (s, 3F), −68.51 (s, 3F). MS (FD) Calcd. for $C_{23}H_{10}F_6N_6Pt$ [M$^+$]: m/z: 679.1, Found: 679.0. Anal. Calcd. for $C_{23}H_{10}F_6N_6Pt$: C, 40.66; H, 1.48; N, 12.37, Found: C, 40.71; H, 1.86; N, 12.42.

Example 8

Preparation of Complex (IB-2):

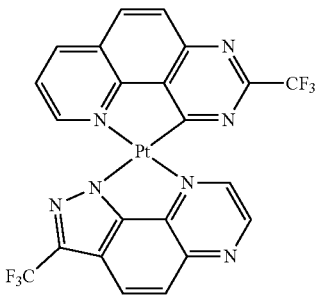

(IB-2)

The experimental steps were the same as those of complex (IB-1), but L8 was used as the chelate. The crude product was purified by sublimation ($10^{-5}$ mmHg, 330° C. to 350° C.) to obtain a yellow solid with a yield of 63%.

$^1$H and $^{19}$F NMR spectra may not be obtained due to poor solubility. MS (EI) Calcd. for $C_{22}H_9F_6N_7Pt$ [M$^+$]: m/z: 680.1, Found: 680.1. Anal. Calcd. for $C_{22}H_9F_6N_7Pt$: C, 38.83; H, 1.33; N, 14.41, Found: C, 38.98; H, 1.51; N, 14.44.

Example 9

Preparation of Complex (ID-1):

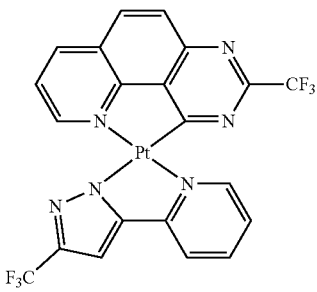

(ID-1)

A mixture of Pt(pnaz)(DMSO)Cl (150 mg, 0.3 mmol), fppzH (63 mg, 0.3 mmol) and NaOAc (66 mg, 0.8 mmol) in 6 mL of glacial acetic acid was refluxed for 12 h under N$_2$. After removal of solvent, the solid was triturated with water and acetone, and evacuated to dryness. Sublimation ($10^{-5}$ mmHg) at 300~320° C. afforded 140 mg of dark blue solid; yield: 79%.

Spectral data of complex (ID-1): $^1$H NMR (500 MHz, DMSO-$d_6$, 353 K): δ 10.25 (d, J=6.0 Hz, 1H), 10.12 (d, J=5.0 Hz, 1H), 8.44 (d, J=7.7 Hz, 1H), 7.96 (d, J=8.7 Hz, 1H), 7.71 (t, J=7.4 Hz, 1H), 7.58 (t, J=6.3 Hz, 1H), 7.52 (d, J=9.0 Hz, 1H), 7.50 (d, J=8.1 Hz, 1H), 7.02 (t, J=5.5 Hz, 1H), 6.71 (s, 1H). $^{19}$F NMR (470 MHz, DMSO-$d_6$, 353 K): δ −59.16 (s, 3F), −68.50 (s, 3F). MS (FD) Calcd. for $C_{21}H_{10}F_6N_6Pt$ [M$^+$]: m/z: 655.1, Found: 655.0. Anal. Calcd. for $C_{21}H_{10}F_6N_6Pt$: C, 38.48; H, 1.54; N, 12.82, Found: C, 38.59; H, 1.85; N, 12.92.

Example 10

Preparation of Complex (ID-2):

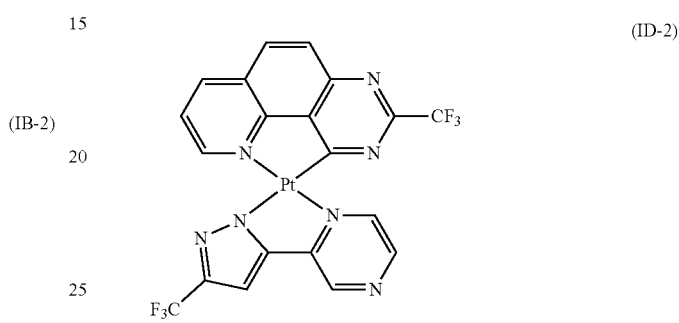

(ID-2)

A mixture of Pt(pnaz)(DMSO)Cl (150 mg, 0.3 mmol), fprpzH (64 mg, 0.3 mmol) and NaOAc (66 mg, 0.8 mmol) in 6 mL of glacial acetic acid was refluxed for 12 h under N$_2$ atmosphere. After removal of solvent, the solid was triturated with water and acetone, and evacuated to dryness. Sublimation ($10^{-5}$ mmHg) at 300~320° C. afforded 125 mg of light brown solid; yield: 71%.

Spectral data of complex (ID-2): $^1$H NMR (500 MHz, DMSO-$d_6$, 353 K): δ 10.73 (d, J=3.0 Hz, 1H), 10.54 (d, J=5.9 Hz, 1H), 9.39 (s, 1H), 8.97 (d, J=7.8 Hz, 1H), 8.83 (d, J=3.5 Hz, 1H), 8.48 (d, J=9.0 Hz, 1H), 8.13 (t, J=7.0 Hz, 1H), 8.05 (d, J=8.9 Hz, 1H), 7.41 (s, 1H). $^{19}$F NMR (470 MHz, DMSO-$d_6$, 353 K): δ −59.32 (s, 3F), −68.46 (s, 3F). MS (FD) Calcd. for $C_{20}H_9F_6N_7Pt$ [M$^+$]: m/z: 656.1, Found: 656.1. Anal. Calcd. for $C_{20}H_9F_6N_7Pt$: C, 36.60; H, 1.38; N, 14.94, Found: C, 36.75; H, 1.47; N, 14.99.

Example 11

Preparation of Complex (ID-3):

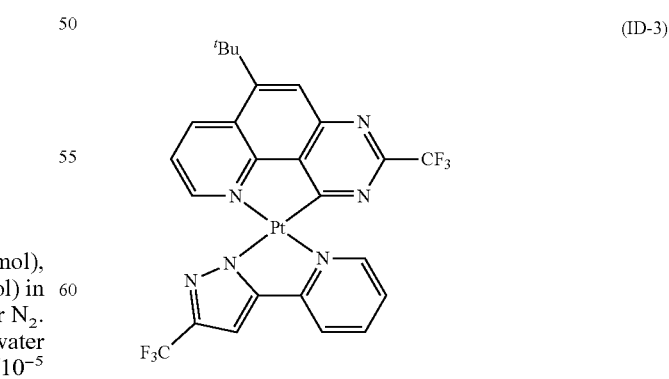

(ID-3)

This complex was synthesized similarly to Pt(pnaz)(fppz) from 5tpnazH; a red solid was obtained after sublimation ($10^{-5}$ mmHg) at 300~320° C.; yield: 70%.

Spectral data of complex (ID-3): $^1$H NMR (500 MHz, DMSO-d$_6$, 353 K): δ 10.92 (d, J=6.2 Hz, 1H), 10.86 (d, J=4.3 Hz, 1H), 9.41 (d, J=8.0 Hz, 1H), 8.26 (t, J=8.4 Hz, 1H), 8.13 (t, J=7.5 Hz, 2H), 7.97 (s, 1H), 7.62 (t, J=7.3 Hz, 1H), 7.35 (s, 1H), 1.73 (s, 9H). $^{19}$F NMR (470 MHz, DMSO-d$_6$, 353 K): δ −59.16 (s, 3F), −68.60 (s, 3F). MS (FD) Calcd. for C$_{25}$H$_{18}$F$_6$N$_6$Pt [M$^+$]: m/z: 711.1, Found: 711.1. Anal. Calcd. for C$_{25}$H$_{18}$F$_6$N$_6$Pt: C, 42.20; H, 2.55; N, 11.81, Found: C, 42.28; H, 2.70; N, 11.86.

Example 12

Preparation of Complex (ID-4):

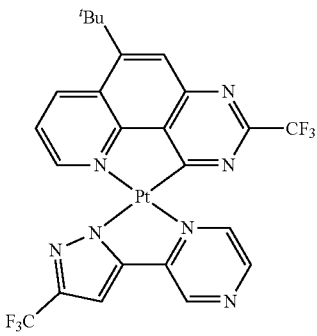

(ID-4)

This complex was synthesized similarly to [Pt(pnaz)(fprpz)] from 5tpnazH; a bluish green solid was obtained after sublimation (10$^{-5}$ mmHg) at 310~330° C.; yield: 89%.

Spectral data of complex (ID-4): $^1$H NMR (500 MHz, DMSO-d$_6$, 353 K): δ 10.62 (d, J=3.2 Hz, 1H), 10.50 (d, J=5.6 Hz, 1H), 9.35 (d, J=8.6 Hz, 1H), 9.23 (s, 1H), 8.71 (d, J=3.3 Hz, 1H), 8.02 (dd, J=8.6, 5.5 Hz, 1H), 7.88 (s, 1H), 7.28 (s, 1H), 1.72 (s, 9H). $^{19}$F NMR (470 MHz, DMSO-d$_6$, 353 K): δ −59.32 (s, 3F), −68.50 (s, 3F). MS (FD) Calcd. for C$_{24}$H$_{17}$F$_6$N$_7$Pt [M$^+$]: m/z: 712.1, Found: 712.1. Anal. Calcd. for C$_{24}$H$_{17}$F$_6$N$_7$Pt: C, 40.46; H, 2.40; N, 13.76, Found: C, 40.53; H, 2.56; N, 13.84.

Example 13

Preparation of Complex (ID-5):

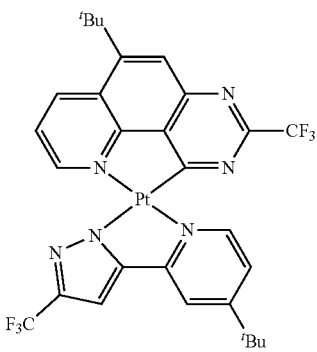

(ID-5)

This complex was synthesized similarly to [Pt(5tpnaz)(fprpz)] from 4tfppzH; a pink solid was obtained after sublimation (10$^{-5}$ mmHg) at 300~320° C.; yield: 80%.

Spectral data of complex (ID-5): $^1$H NMR (500 MHz, DMSO-d$_6$, 353 K): δ 10.44 (d, J=4.7 Hz, 1H), 10.34 (d, J=6.1 Hz, 1H), 9.18 (d, J=8.6 Hz, 1H), 7.77 (t, J=6.7 Hz, 1H), 7.75 (d, J=5.8 Hz, 2H), 7.23 (d, J=5.9 Hz, 1H), 7.05 (s, 1H), 1.71 (s, 9H), 1.44 (s, 9H). $^{19}$F NMR (470 MHz, DMSO-d$_6$, 353 K): δ −59.06 (s, 3F), −68.52 (s, 3F). MS (FD) Calcd. for C$_{29}$H$_{26}$F$_6$N$_6$Pt [M$^+$]: m/z: 767.2, Found: 767.2. Anal. Calcd. for C$_{29}$H$_{26}$F$_6$N$_6$Pt: C, 45.38; H, 3.41; N, 10.95, Found: C, 45.33; H, 3.37; N, 10.57.

Example 14

Preparation of Complex (ID-6):

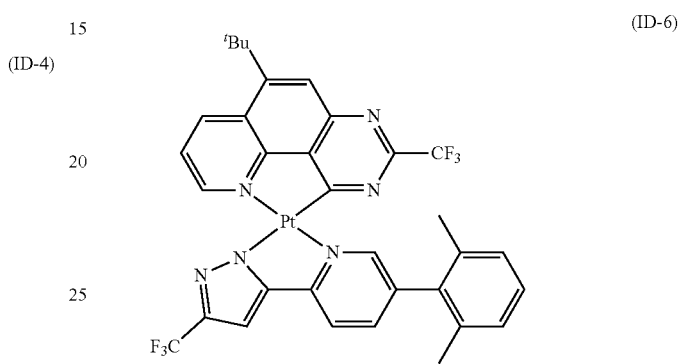

(ID-6)

This complex was synthesized similarly to Pt(5tpnaz)(fprpz) from 3dmfppzH; a pink solid was obtained after sublimation (10$^{-5}$ mmHg) at 280~300° C.; yield: 60%.

Spectral data of complex (ID-6): $^1$H NMR (500 MHz, DMSO-d$_6$, 298 K): δ 10.75 (d, J=1.6 Hz, 1H), 10.68 (d, J=5.1 Hz, 1H), 9.23 (d, J=8.5 Hz, 1H), 8.16 (dd, J=8.0, 1.8 Hz, 1H), 8.05 (d, J=8.1 Hz, 1H), 7.89 (td, J=7.0, 3.4 Hz, 1H), 7.62 (s, 1H), 7.34 (td, J=7.6, 1.8 Hz, 1H), 7.28 (d, J=1.1 Hz, 2H), 7.27 (s, 1H), 2.26 (s, 6H), 1.62 (s, 9H). $^{19}$F NMR (470 MHz, DMSO-d$_6$, 298 K): δ −58.59 (s, 3F), −68.68 (s, 3F). MS (FD) Calcd. for C$_{33}$H$_{26}$F$_6$N$_6$Pt [M$^+$]: m/z: 815.2, Found: 815.2. Anal. Calcd. for C$_{33}$H$_{26}$F$_6$N$_6$Pt: C, 48.59; H, 3.21; N, 10.30, Found: C, 48.91; H, 3.34; N, 10.34.

Figure 2:
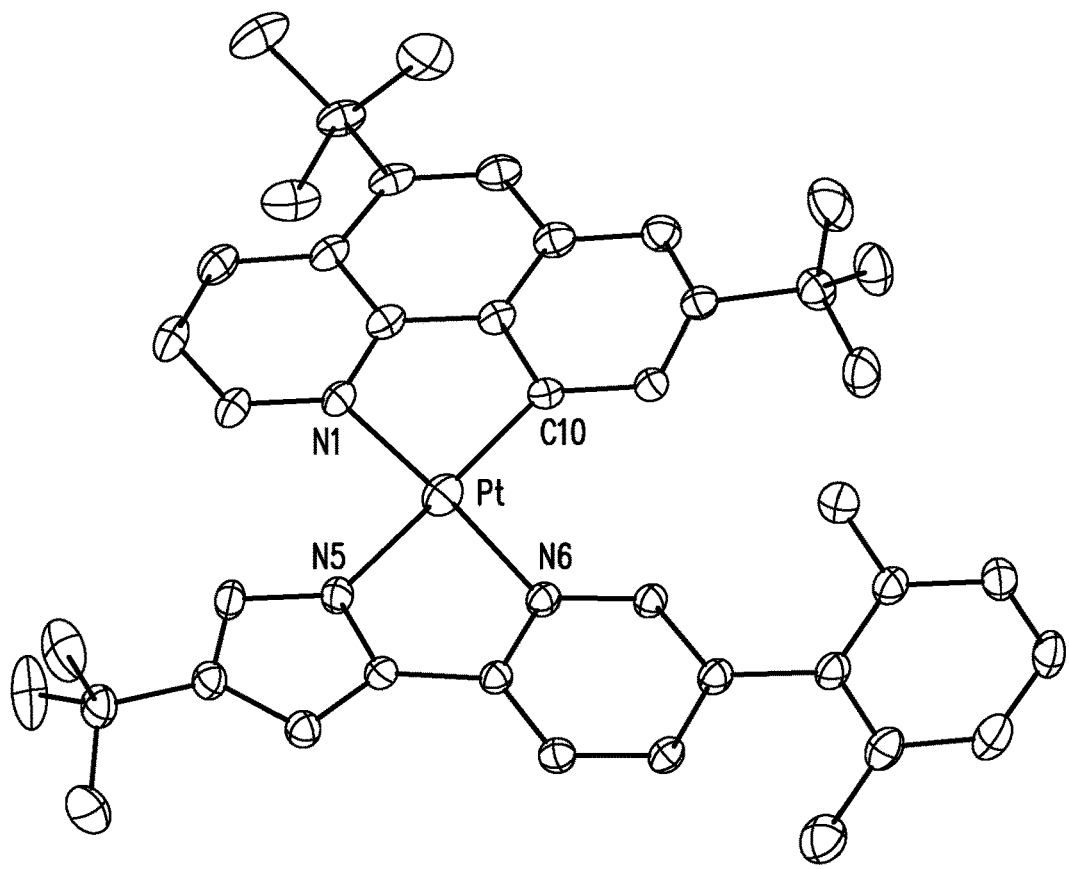
FIG. 2 shows the molecular structure of platinum complex (ID-6) of the invention, obtained by the single crystal X-ray diffraction study.

FIG. 2 shows the single crystal X-ray diffraction structural diagram of complex (ID-6) of the invention. This structure confirms the validity of our method in providing the desired platinum complex of the invention.

Example 15

Preparation of Complex (ID-7):

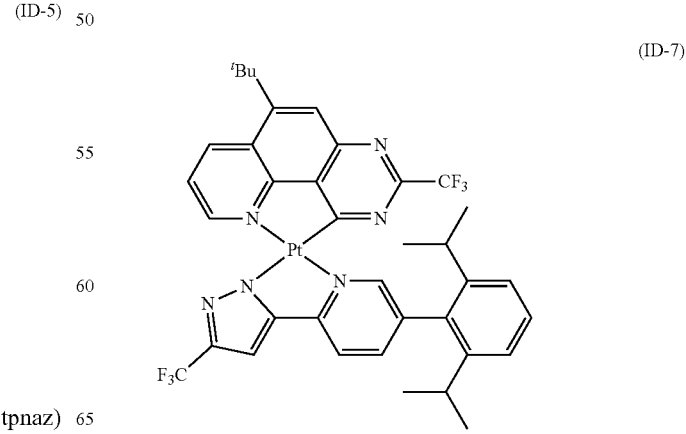

(ID-7)

This complex was synthesized similarly to Pt(5tpnaz)(fprpz) from 3dipfppzH. Furthermore, after removal of acetic acid under vacuum, the residue was dissolved in $CH_2Cl_2$, washed with deionized water twice, dried over anhydrous $Na_2SO_4$ and concentrated under vacuum. It was next purified by column chromatography eluting with a 1:1 mixture of ethyl acetate and hexane, followed by sublimation ($10^{-5}$ mmHg) at 280~300° C. to afford a yellow solid; yield: 55%.

Spectral data of complex (ID-7): $^1$H NMR (500 MHz, DMSO-$d_6$, 298 K): δ 11.04 (s, 1H), 10.86 (d, J=5.2 Hz, 1H), 9.42 (d, J=8.7 Hz, 1H), 8.28 (d, J=8.0 Hz, 1H), 8.22 (dd, J=8.0, 1.5 Hz, 1H), 8.15 (dd, J=5.4, 3.2 Hz, 1H), 7.88 (s, 1H), 7.50 (d, J=5.9 Hz, 2H), 7.34 (d, J=7.9 Hz, 2H), 2.60-2.54 (m, 2H), 1.66 (s, 9H), 1.12 (d, J=6.8 Hz, 6H), 1.05 (d, J=6.7 Hz, 6H). $^{19}$F NMR (470 MHz, DMSO-$d_6$, 298 K): δ −58.93 (s, 3F), −69.24 (s, 3F). MS (FD) Calcd. for $C_{37}H_{34}F_6N_6Pt$ [M$^+$]: m/z: 871.2, Found: 871.1. Anal. Calcd. for $C_{37}H_{34}F_6N_6Pt$: C, 50.98; H, 3.93; N, 9.64, Found: C, 51.24; H, 4.03; N, 9.68.

Figure 3:
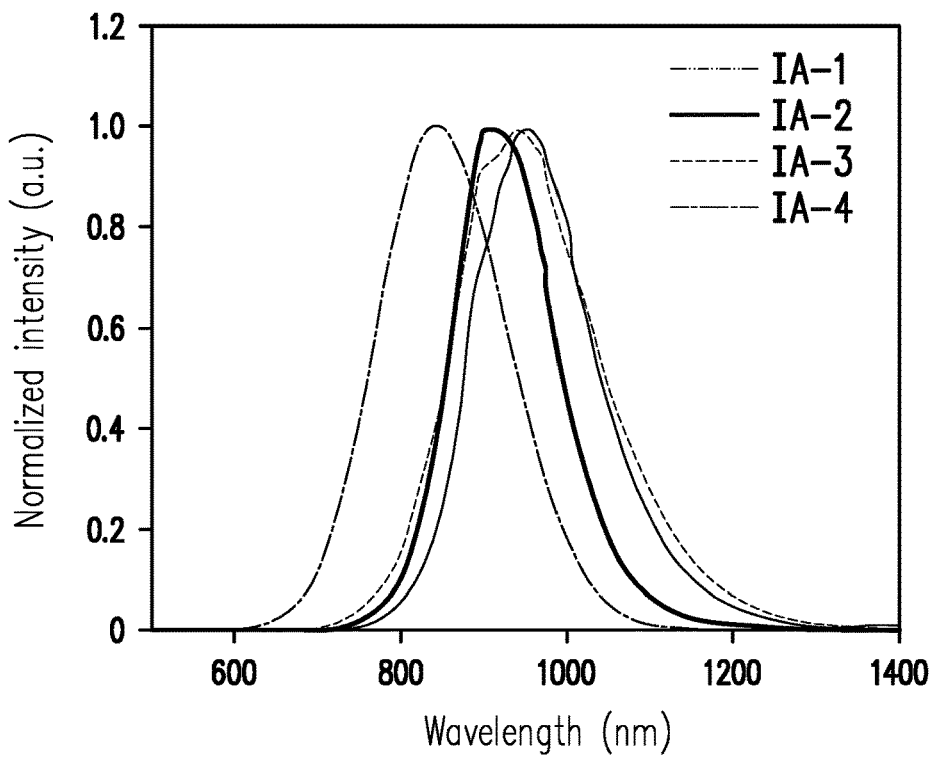
FIG. 3 shows the emission spectrum of the vapor-deposited thin film of platinum complexes (IA-1), (IA-2), (IA-3), and (IA-4) of the invention.
Figure 5:
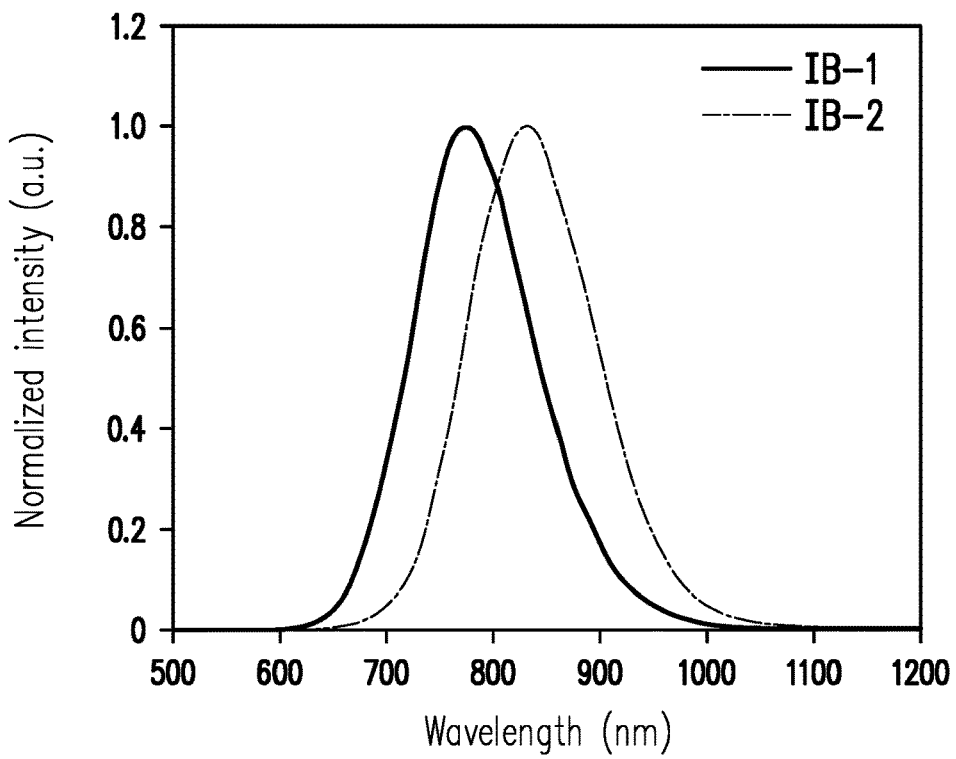
FIG. 5 shows the emission spectrum of the vapor-deposited thin film of each of platinum complexes (IB-1) and (IB-2) of the invention.
Figure 7:
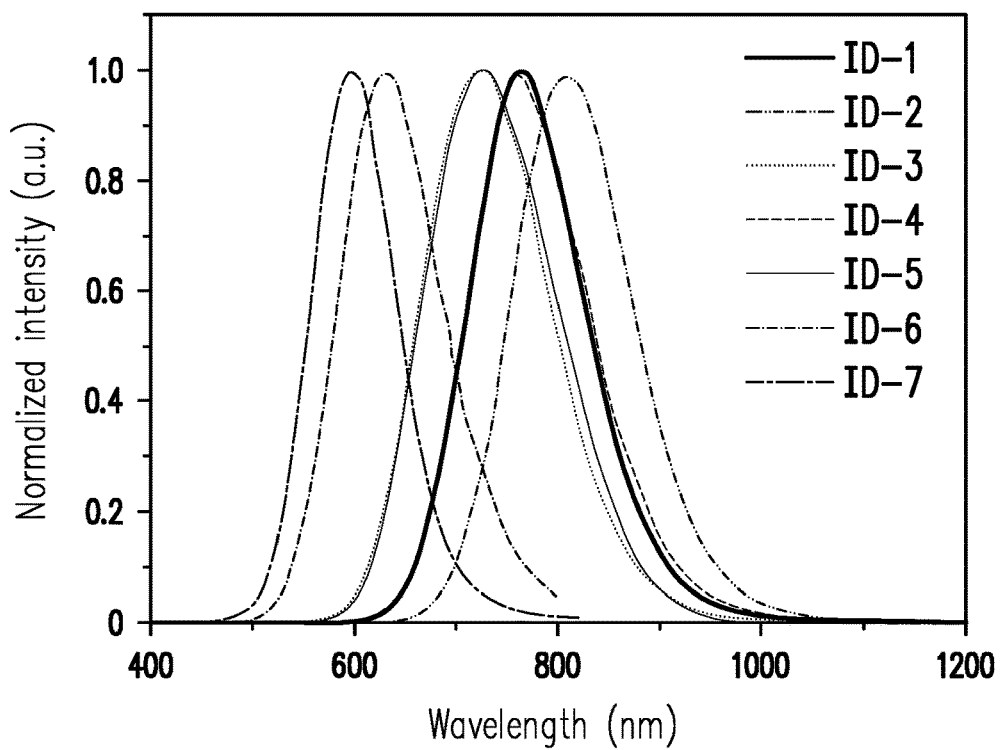
FIG. 7 shows the emission spectrum of the vapor-deposited thin film of platinum complexes (ID-1), (ID-2), (ID-3), (ID-4), (ID-5), (ID-6), and (ID-7) of the invention.

FIG. 3 shows the emission spectrum of the vapor-deposited thin film of complexes (IA-1), (IA-2), (IA-3) and (IA-4) of the invention. FIG. 5 shows the emission spectrum of the vapor-deposited thin film of complexes (IB-1) and (IB-2) of the invention. FIG. 7 shows the emission spectrum of the vapor-deposited thin film of complexes (ID-1), (ID-2), (ID-3), (ID-4), (ID-5), (ID-6), and (ID-7) of the invention, respectively. The emission peak positions (em $\lambda_{max}$), emission lifetimes ($\tau_{obs}$), and quantum yields (Φ) of the above-mentioned complexes of the invention are listed in Table 1.

TABLE 1

| complex | em. $\lambda_{max}$ (nm)[a] | Φ (%)[a] | $\tau_{obs}$ (ns)[a] |
|---|---|---|---|
| IA-1 | 955 | 13.3 | 30 |
| IA-2 | 910 | 16.0 | 54 |
| IA-3 | 945 | 12.7 | 112 |
| IA-4 | 840 | 17.8 | 239 |
| IB-1 | 775 | 48.0 | 150 |
| IB-2 | 831 | 39.2 | 170 |
| ID-1 | 764 | 46.74 | 230 |
| ID-2 | 810 | 53.90 | 290 |
| ID-3 | 724 | 42.00 | 780 |
| ID-4 | 760 | 46.39 | 530 |
| ID-5 | 727 | 63.77 | 730 |
| ID-6 | 632 | 100 | 1400 |
| ID-7 | 600 | 84.19 | 1550 |

[a]The measurements of the photoluminescent spectrum, quantum yield, and emission lifetime were performed with vacuum-evaporated films (100 nm in thickness).

It may be seen from FIG. 3, FIG. 5, FIG. 7, and Table 1 that the emission peak maxima ($\lambda_{max}$) of platinum complexes of the invention are between 600 nm and 955 nm, so the platinum complexes of the invention have a wide range of applications. For example, the emission wavelengths of the platinum complexes (IA-1) to (IA-4), (IB-1) to (IB-2), and (ID-1) to (ID-5) of the invention are greater than 700 nm, falling within the near-infrared regime and, therefore, the platinum complexes (IA-1) to (IA-4), (IB-1) to (IB-2), and (ID-1) to (ID-5) of the invention may be used to generate invisible near infrared emission for military usages or in medical fields. The platinum complexes (ID-6) to (ID-7) of the invention have emission wavelengths in the range of visible light and, hence, may be applied in the fabrication of OLED showing efficient emission in the visible region.

Figure 4:
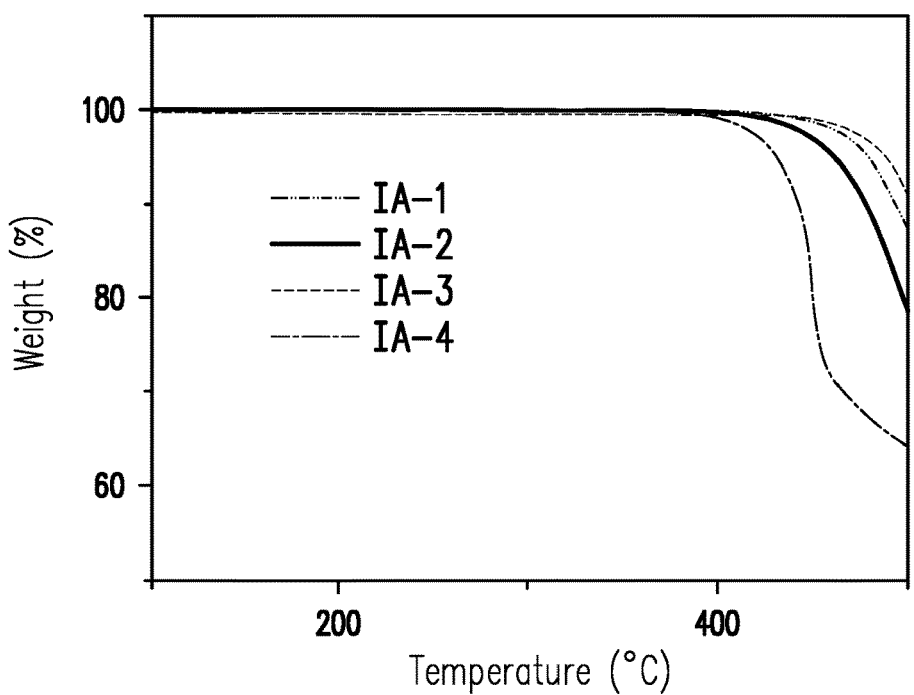
FIG. 4 shows the thermogravimetric analysis diagram of platinum complexes (IA-1), (IA-2), (IA-3), and (IA-4) of the invention.
Figure 6:
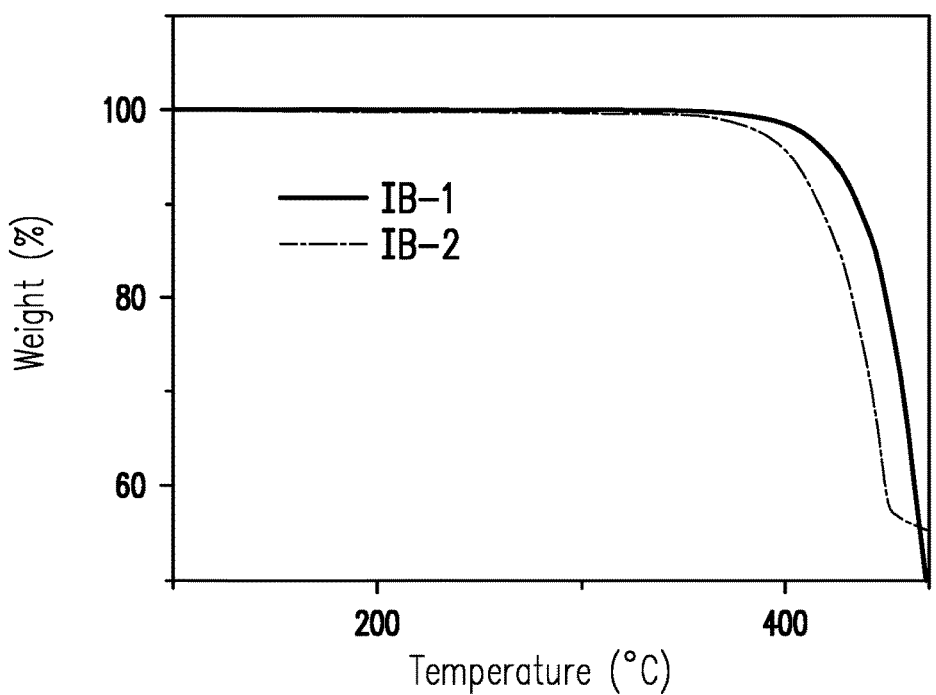
FIG. 6 shows the thermogravimetric analysis diagram of platinum complexes (IB-1) and (IB-2) of the invention.
Figure 8:
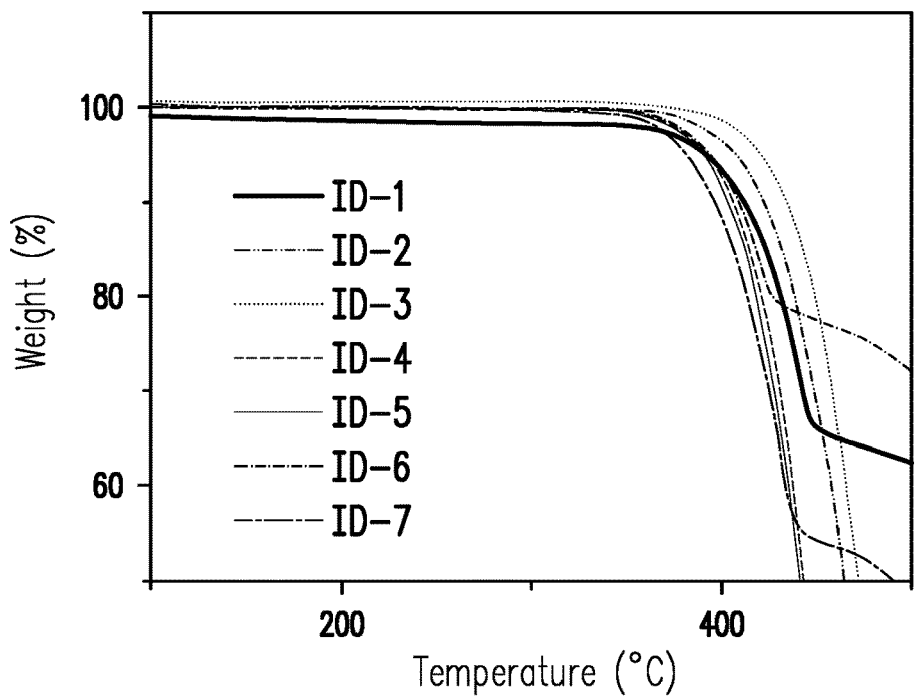
FIG. 8 shows the thermogravimetric analysis diagram of platinum complexes (ID-1), (ID-2), (ID-3), (ID-4), (ID-5), (ID-6), and (ID-7) of the invention.

FIG. 4 shows the thermogravimetric analysis diagram of complexes (IA-1), (IA-2), (IA-3), and (IA-4) of the invention. FIG. 6 shows the thermogravimetric analysis diagram of complexes (IB-1) and (IB-2) of the invention. FIG. 8 shows the thermogravimetric analysis diagram of complexes (ID-1), (ID-2), (ID-3), (ID-4), (ID-5), (ID-6), and (ID-7) of the invention, respectively. The decomposition temperature ($T_d$) at which each complex of the invention has a 5 wt % loss in weight is listed in Tables 2, 3, and 4 below.

TABLE 2

| Complex | $T_d$ (° C.)[b] |
|---|---|
| IA-1 | 479 |
| IA-2 | 461 |
| IA-3 | 488 |
| IA-4 | 431 |

[b]$T_d$ is the decomposition temperature showing a 5 wt. % loss in weight.

TABLE 3

| Complex | $T_d$ (° C.)[b] |
|---|---|
| IB-1 | 426 |
| IB-2 | 442 |

[b]$T_d$ is the decomposition temperature showing a 5 wt. % loss in weight.

TABLE 4

| Complex | $T_d$ (° C.)[b] |
|---|---|
| ID-1 | 391 |
| ID-2 | 407 |
| ID-3 | 416 |
| ID-4 | 392 |
| ID-5 | 389 |
| ID-6 | 388 |
| ID-7 | 380 |

[b]$T_d$ is the decomposition temperature showing a 5 wt. % loss in weight.

From FIG. 4, FIG. 6, FIG. 8, and Tables 2 to 4, it may be seen that all platinum complexes of the invention possess a decomposition temperature exceeding 380° C. Decomposition temperature of the studied platinum complexes was obtained using thermogravimetric analysis to the temperature at which the weight loss of 5 wt. % was recorded. Platinum complexes with a higher decomposition temperature are capable to perform vacuum sublimation at a higher temperature and fabrication of OLED devices by chemical vapor deposition without experiencing material decomposition. Therefore, better thermal stability may improve the performance of these luminescent materials.

All platinum complexes of this invention possess at least one bidentate chelating chelate composed of one pyridine based dative coordination unit that linked to the cyclometalating pyrimidinato entity and, between these two coordination units, there existed a third 6-membered aromatic ring structure. Therefore, both the improved rigidity and planarity of chelate can be effectively maintained. In this invention, the same structural characteristics of chelate provide the resulting platinum complex with better photophysical properties, such as red shifted emission to near infrared region with peak maxima beyond 700 nm and with increased luminescence quantum efficiency.

Furthermore, all these platinum complexes undergo a spontaneous self-assembling process during vacuum deposition, giving one-dimensional stacked molecules in thin films, which is facilitated by the formation of shortened intermolecular Pt . . . Pt bonding interaction. Also, formation of well-aligned platinum complexes in thin films and with shortened intermolecular Pt . . . Pt interaction are consistent with the higher tendency of square-planar based platinum complexes in forming aggregated dimer, trimer and even oligomer in both solution and condensed states. Moreover, the existence of shortened Pt . . . Pt interaction promotes formation of MMLCT transition process after photo- and/or electronic excitation, giving significantly red-shifted emission wavelength, even down to the near-infrared region. In addition, these studied platinum complexes possess two relatively weakened N—Pt dative and two stronger C—Pt covalent bonding interactions arranged in the trans-disposition. Since the C—Pt bond strength is greater than that of N—Pt bond, their overall metal-chelate bond strength is significantly higher than that of conventional platinum complex with only four relatively weakened N—Pt bonding interactions. Hence, the stronger C—Pt bonding interactions would increase the crystal field stabilization energy of platinum complex and, in turn, destabilize the metal-centered dd excited state, to which the non-radiative decay in the excited state should be significantly reduced in comparison to the platinum complex bearing four N—Pt dative bonding interactions and, hence, afforded the increased luminescence quantum efficiency. Alternatively, our synthetic methodologies are simple and very easy to handle, which is important for future commercial (and scale up) operation. Lastly, all structural designs mentioned in this invention allowed the preparation of platinum complexes exhibiting efficient near infrared luminescence in region beyond 700 nm, together with the improved luminescent efficiency. These photophysical properties are superior to those of all platinum complexes documented in literature.

Although the invention has been described with reference to the above embodiments, it will be apparent to one having ordinary skill in the art that modifications to the described embodiments may be made without departing from the spirit of the invention. Accordingly, the scope of the invention is defined by the attached claims not by the above detailed descriptions.

What is claimed is:

1. A platinum complex, having a structure represented by general formula (I):

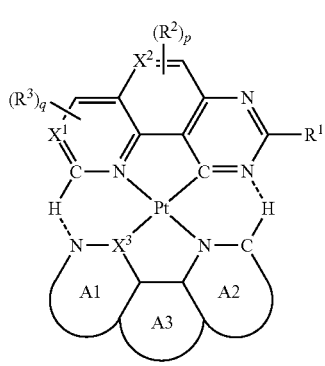

(I)

wherein

A1 and A2 are each independently an unsaturated 6-membered ring containing one N atom or two N atoms, A3 is an unsaturated 6-membered ring, and A3 may optionally be formed between A1 and A2;

$X^1$, $X^2$, and $X^3$ are each independently carbon or nitrogen;

$R^1$ is hydrogen, substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5;

$R^2$ and $R^3$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3;

p and q are each independently an integer of 1 to 2;

when p is equal to 2, two $R^2$'s may join to form a $C_3$-$C_8$ aromatic or nitrogen-containing heteroaromatic ring; and when q is equal to 2, two $R^3$'s may join to form a $C_3$-$C_8$ aromatic or nitrogen-containing heteroaromatic ring.

2. The platinum complex of claim 1, having a structure represented by general formula (IA):

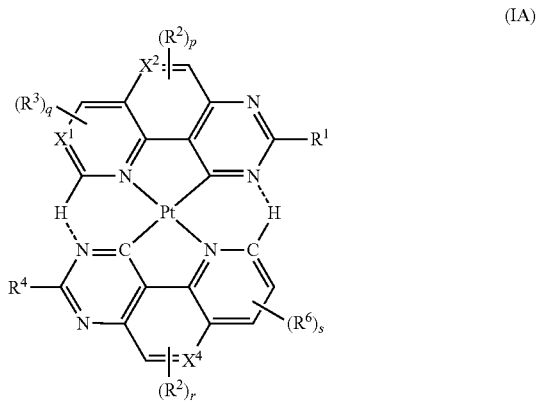

(IA)

wherein $X^4$ is carbon or nitrogen;

$R^4$ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5;

$R^5$ and $R^6$ are each independently hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3;

r and s are each independently an integer of 1 to 2;

when r is equal to 2, two $R^5$'s may join to form a $C_3$-$C_8$ aromatic or nitrogen-containing heteroaromatic ring; and when s is equal to 2, two $R^6$'s may join to form a $C_3$-$C_8$ aromatic or nitrogen-containing heteroaromatic ring.

3. The platinum complex of claim 2, having a structure represented by any of formula (IA-1) to formula (IA-22):

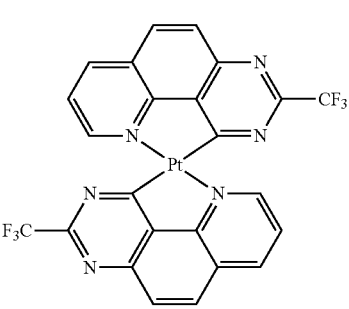

IA-1

IA-2
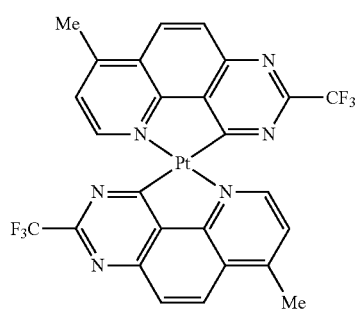
IA-3
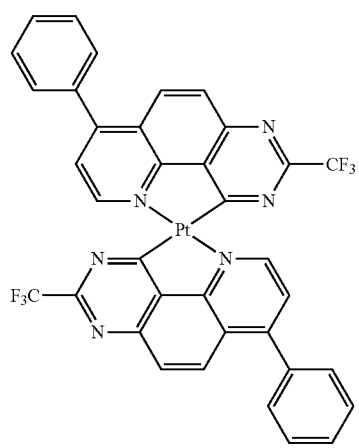
IA-4
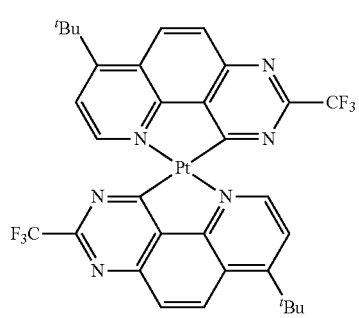
IA-5
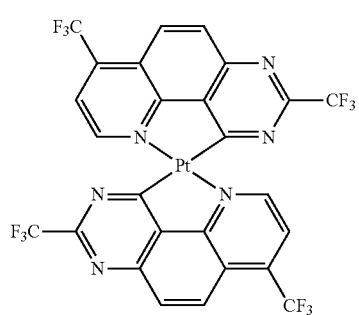
IA-6
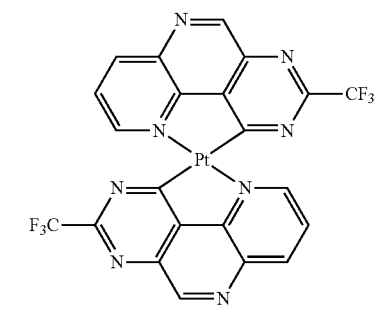
IA-7
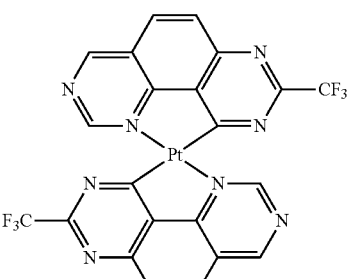
IA-8
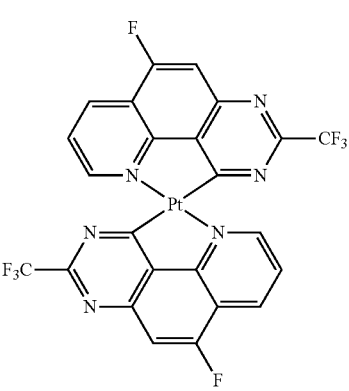
IA-9
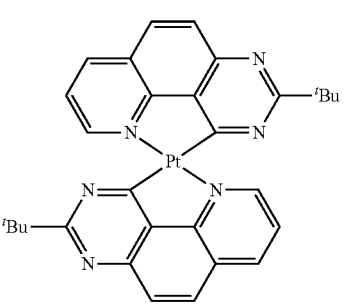
IA-10
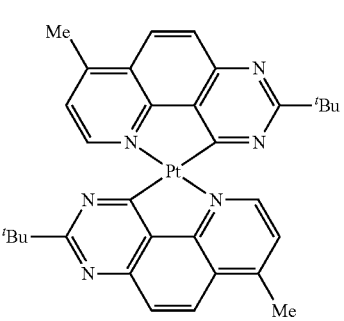

IA-11
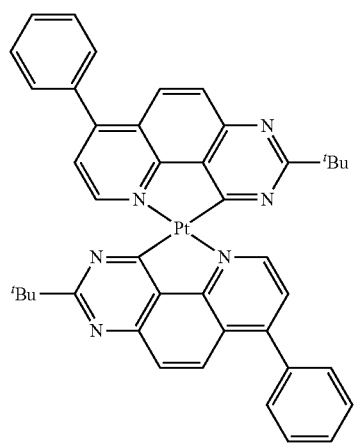
IA-12
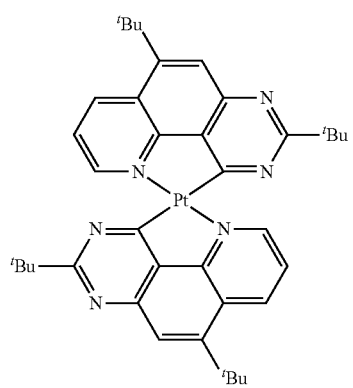
IA-13
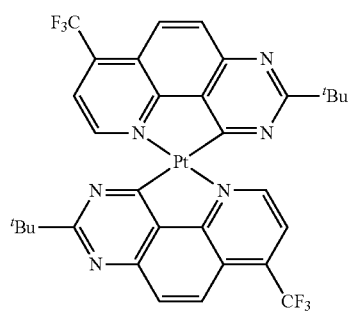
IA-14
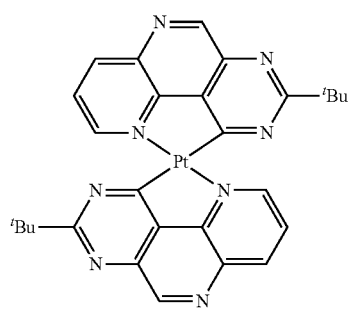
IA-15
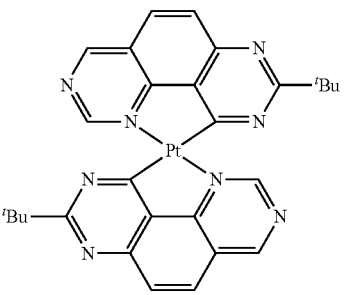
IA-16
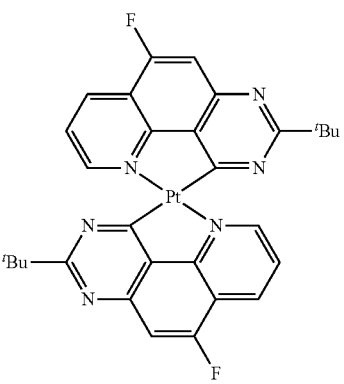
IA-17
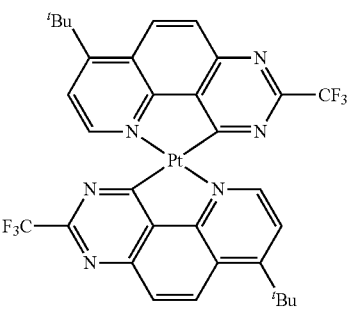
IA-18
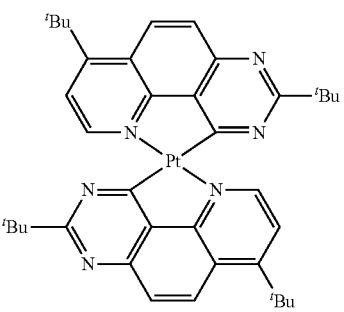

4. The platinum complex of claim 1, having a structure represented by general formula (IC):

wherein
R⁴ is substituted or unsubstituted $C_1$-$C_6$ alkyl, —$CF_2H$, —$CFH_2$, substituted or unsubstituted $C_6$-$C_{12}$ aryl, or —$C_mF_{2m+1}$, and m is an integer of 1 to 5;
R⁶ is hydrogen, substituted or unsubstituted $C_1$-$C_{12}$ alkyl, substituted or unsubstituted $C_1$-$C_6$ alkoxy, substituted or unsubstituted $C_6$-$C_{12}$ aryl, or —$C_nF_{2n+1}$, and n is an integer of 0 to 3;
s is an integer of 1 to 3; and
when s is equal to or greater than 2, two or more R⁶'s may join to form a $C_3$-$C_8$ aromatic or nitrogen-containing heteroaromatic ring.

5. The platinum complex of claim 4, having a structure represented by any of formula (IC-1) to formula (IC-16):

-continued
IC-2
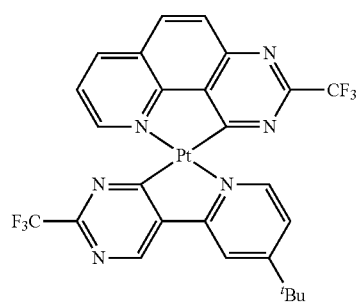
IC-3
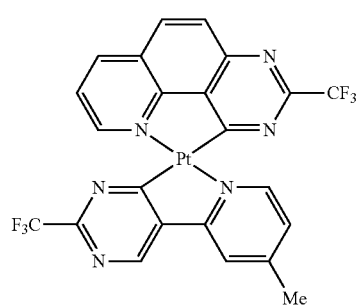
IC-4
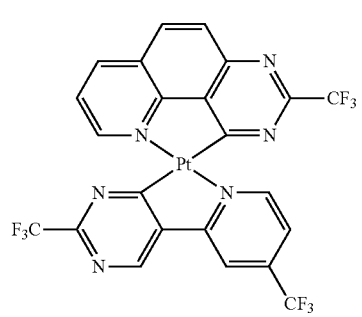
IC-5
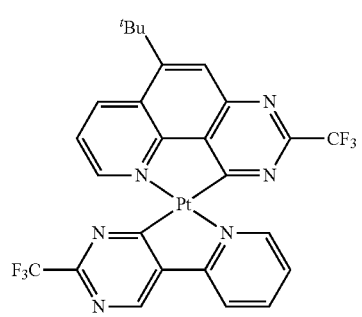
IC-6
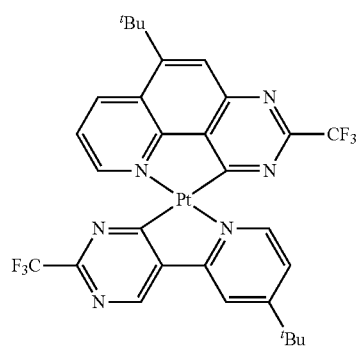
-continued
IC-7
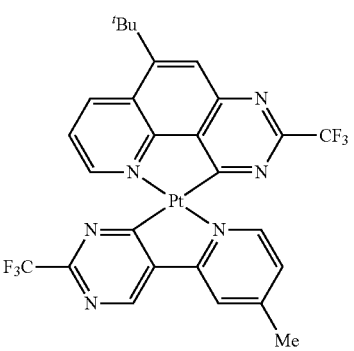
IC-8
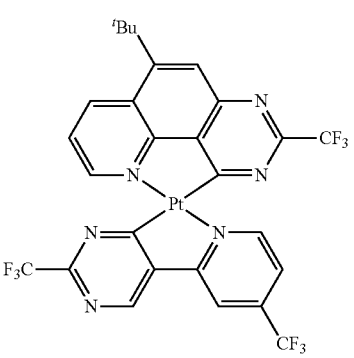
IC-9
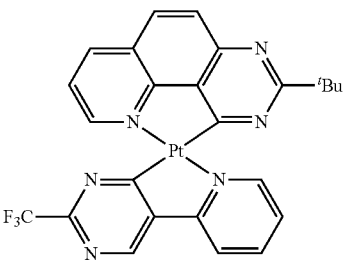
IC-10
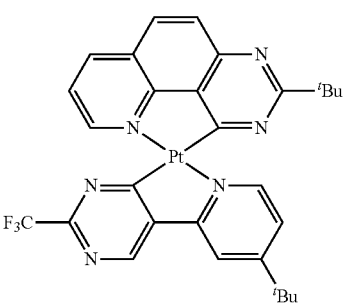
IC-11
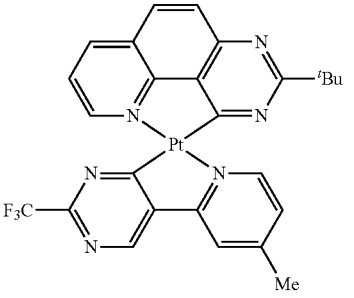

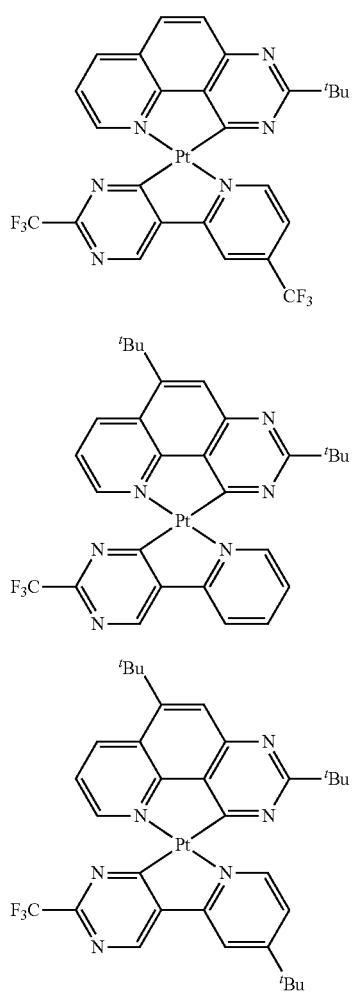
IC-12
IC-13
IC-14
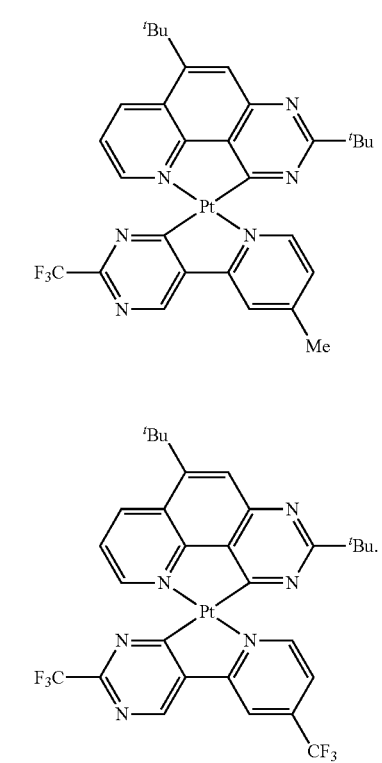
IC-15
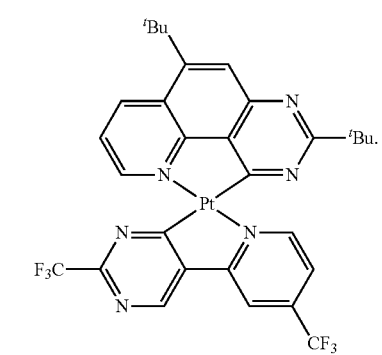
IC-16
6. The platinum complex of claim 1, wherein a peak emission wavelength thereof is between 550 nm and 1,000 nm, or more than 1,000 nm.
7. An apparatus for providing a visible emission or a near-infrared emission, comprising the platinum complex of claim 1.
* * * * *